US012745338B1

(12) United States Patent
Burns et al.

(10) Patent No.: US 12,745,338 B1
(45) **Date of Patent: *Sep. 22, 2026**

(54) WATERPROOFING CEILING FAN COMPONENTS

(71) Applicant: HKC-US, LLC, Memphis, TN (US)

(72) Inventors: James Burns, Memphis, TN (US); Matthew Willard, Collierville, TN (US); Brendan Byrne, Germantown, TN (US)

(73) Assignee: HKC-US, LLC, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/439,930

(22) Filed: Jan. 5, 2026

Related U.S. Application Data

(60) Continuation-in-part of application No. 19/267,068, filed on Jul. 11, 2025, now Pat. No. 12,520,408, which is a division of application No. 17/976,039, filed on Oct. 28, 2022, now Pat. No. 12,369,243, which is a continuation-in-part of application No. 16/172,108, filed on Oct. 26, 2018, now Pat. No. 11,486,404.

(60) Provisional application No. 62/578,830, filed on Oct. 30, 2017.

(51) Int. Cl.
*G08C 17/02* (2006.01)
*F21V 33/00* (2006.01)
*H05B 47/19* (2020.01)

(52) U.S. Cl.
CPC ......... *H05B 47/19* (2020.01); *F21V 33/0096* (2013.01)

(58) Field of Classification Search
CPC ....... F04D 25/088; H05B 47/19; G08C 17/02; F21V 33/0096
USPC .......................................................... 318/162
See application file for complete search history.

(56) References Cited

U.S. PATENT DOCUMENTS 4,592,702 A * 6/1986 Bogage ................. F04D 25/088 416/247 R
5,507,619 A * 4/1996 Ryan ..................... F04D 25/088 416/244 R
5,559,406 A 9/1996 Chang
5,562,421 A * 10/1996 Huang .................. F04D 29/601 416/244 R
5,738,496 A 4/1998 Mehta
6,015,274 A * 1/2000 Bias ...................... F04D 25/088 417/423.1
6,211,632 B1 4/2001 Liao
6,648,488 B1 11/2003 Pearce
(Continued)

*Primary Examiner* — Gabriel Agared
(74) *Attorney, Agent, or Firm* — Steinberger IP Law; Brian S. Steinberger; Hilary F. Steinberger

(57) ABSTRACT

Systems, devices, and methods for providing water resistant and water proof encasements for remote receiver electrical components in ceiling fans. The remote receivers can include printed circuit board with electrical components mounted to a motor, and a printed circuit board with electrical components mounted in a ceiling canopy. All of the printed circuit board and electrical components, except for at least one lead wire are encased in the waterproof encasement. The water-resistant and waterproof encasements can include applications, such as shrink wrap, heat wrap, spray coating, dipping and putty forming the encasements. The encased receivers eliminate the need for plastic shell housing, reduces costs and allowing for the receiver components to fit into smaller spaces.

14 Claims, 32 Drawing Sheets

(56) References Cited

U.S. PATENT DOCUMENTS

| | | | |
|---|---|---|---|
| D523,138 | S | 6/2006 | Burns |
| D524,473 | S | 7/2006 | Burns |
| 8,519,649 | B2 | 8/2013 | Taniguchi et al. |
| 9,453,517 | B1 | 9/2016 | Burns et al. |
| 10,954,948 | B1 | 3/2021 | Lowe |
| 11,029,019 | B1 | 6/2021 | Bucher |
| 11,486,404 | B1 | 11/2022 | Mathis |
| 12,369,243 | B1 | 7/2025 | Mathis |
| 2004/0191087 | A1 | 9/2004 | Liu |
| 2005/0025637 | A1 | 2/2005 | Liao |
| 2008/0018426 | A1 | 1/2008 | Liu |
| 2008/0143272 | A1 | 6/2008 | Byrne et al. |
| 2008/0212292 | A1* | 9/2008 | Yu .......................... H05K 7/209 361/748 |
| 2008/0266867 | A1 | 10/2008 | Byrne |
| 2011/0165002 | A1* | 7/2011 | Noble ................... F04D 25/068 416/1 |
| 2011/0285337 | A1 | 11/2011 | Taniguchi et al. |
| 2013/0049656 | A1 | 2/2013 | Yasui |
| 2013/0106329 | A1 | 5/2013 | Kato et al. |
| 2015/0325112 | A1 | 11/2015 | McPherson |
| 2016/0047391 | A1* | 2/2016 | McPherson ......... F04D 25/0693 318/504 |
| 2018/0231240 | A1 | 8/2018 | Roca |
| 2020/0248898 | A1 | 8/2020 | Chen |
| 2020/0408223 | A1 | 12/2020 | Kuramochi |

* cited by examiner

6. Thermistor 100K/25 ⊠ +-1%
Checks the temperature of PCB and prevets over heating.

Ceiling Fan with Typical Internal Remote Control Receiver

Ceiling Fan with Wrap Encased Internal Remote Control Receiver

Ceiling Fan with Typical Canopy Remote Control Receiver

Ceiling Fan with Encased Canopy Remote Control Receiver

Canopy Remote Control Receiver

WATERPROOFING CEILING FAN COMPONENTS

CROSS-REFERENCE TO RELATED APPLICATIONS

This application is a Continuation-In-Part of U.S. patent application Ser. No. 19/267,068 filed Jul. 11, 2025, which is a Divisional Patent Application of U.S. patent application Ser. No. 17/976,039 filed Oct. 28, 2022, now U.S. Pat. No. 12,520,408, which is a Continuation-In-Part of U.S. patent application Ser. No. 16/172,108 filed Oct. 26, 2018, now U.S. Pat. No. 11,486,404, which claims the benefit of priority to U.S. Provisional Patent Application Ser. No. 62/578,830 filed Oct. 30, 2017. The entire disclosure of each of the applications listed in this paragraph are incorporated herein by specific reference thereto.

FIELD OF INVENTION

This invention relates to switch housing remote controls inside of ceiling fans, and in particular to systems, devices, and methods for providing switch housing remote controls for ceiling fans, wherein the remote receiver in the ceiling fan housing uses existing capacitors installed in the ceiling fan and shares those capacitors with existing mechanical pull chains for the ceiling fan, which eliminates the need for separate capacitors in the remote receiver.

BACKGROUND AND PRIOR ART

Ceiling fans on the market now utilize a capacitor for the ceiling fan speeds and a capacitor for lights. Remote controls currently use a second set of capacitors built into the remote receiver housing inside of the ceiling fan to control the fan speeds and lights.

FIG. 1A is a prior art view of a ceiling fan control only with the pull chain connected to the capacitor and the fan motor. FIG. 1B is another prior art view of a traditional ceiling fan using a separate capacitor for the pull chain and a separate capacitor for the remote control receiver, both with the fan motor.

FIG. 2 is a prior art view of a ceiling fan 1 having a remote receiver 12 installed in the canopy 10 that is mounted to a ceiling. The typical remote receiver can have a generally rectangular box configuration of approximately 4.5 inches by approximately 2 inches by approximately 0.75 inches.

U.S. Pat. No. 5,738,496 to Mehta, which is incorporated by reference in its' entirety, shows a traditional assembly of having a second set of capacitors in the remote receiver, and where the fan's capacitors are redundant and do not work with the remote control. The remote bypasses the fan's capacitors and uses its own.

As such, the extra set of capacitors adds additional expense to the manufacture of the ceiling fans and requires additional space in the switch housing, which also requires more costs for materials to have a larger switch housing, as well as extra weight, and extra power costs.

Thus, the need exists for solutions to the above problems with the prior art.

SUMMARY OF THE INVENTION

A primary objective of the present invention is to provide systems, devices, and methods for providing switch housing remote controls for ceiling fans, wherein the remote receiver in the ceiling fan housing uses existing capacitors installed in the ceiling fan and shares those capacitors with existing mechanical pull chains for the ceiling fan, which eliminates the need for separate capacitors in the remote receiver.

A secondary objective of the present invention is to provide systems, devices, and methods for providing switch housing remote controls for ceiling fans, wherein the remote receiver in the ceiling fan housing uses existing capacitors installed in the ceiling fan and shares those capacitors with existing mechanical pull chains for the ceiling fan, which saves space that would have been needed for extra capacitors, and uses a smaller switch housing, which uses less power.

A third objective of the present invention is to provide systems, devices, and methods for providing switch housing remote controls for ceiling fans, wherein the remote receiver in the ceiling fan housing uses existing capacitors installed in the ceiling fan and shares those capacitors with existing mechanical pull chains for the ceiling fan, which is less costly for not requiring extra capacitors.

A fourth objective of the present invention is to provide systems, devices, and methods for providing switch housing remote controls for ceiling fans, with small remote receiver housings that can be removably attached or hardwired inside of a switch housing.

A switch housing remote control system for ceiling fans, can include a ceiling fan motor with ceiling fan blades, a first capacitor adjacent to the ceiling fan motor for controlling operating speeds for the ceiling fan motor, a first mechanical switch for turning power on and off to the first capacitor for controlling operating speeds for the ceiling fan motor, a remote control transmitter for operating the ceiling fan motor, and a switch housing receiver in the ceiling fan for receiving wireless signal transmissions from the remote control transmitter for turning power on and off to the first capacitor for controlling operating speeds for the ceiling fan motor.

The mechanical switch can include a pull chain.

The system can further include at least one light attached to the ceiling fan motor, a second capacitor adjacent to the ceiling fan motor for activating the at least one light, a second mechanical switch for turning power on and off to the second capacitor for activating the at least one light, wherein the remote control transmitter further remotely activates the at least one light by turning power on an off to the second capacitor.

The first mechanical switch and the second mechanical switch can include pull chains.

The second capacitor can further controls dimming levels of the at least one light.

The switch housing receiver can be mounted in a switch housing on which the first mechanical switch is attached, which is located below the ceiling fan blades.

The switch housing receiver can be mounted in a switch housing on which both the first mechanical switch and the second mechanical switch is attached, which is located below the ceiling fan blades.

The switch housing receiver can have dimensions of approximately 2 inches by approximately 1.5 inches by approximately 1 inch.

An embodiment of a switch housing remote control system for ceiling fans, includes:

- a ceiling fan motor with ceiling fan blades and a receiver;
- an existing single first capacitor integrated with the ceiling fan motor and the receiver for controlling operating speeds for the ceiling fan motor;

a first mechanical switch for turning power on and off to the existing first capacitor for controlling operating speeds for the ceiling fan motor;

at least one light attached to the ceiling fan motor;

an existing second capacitor integrated with the at least one light for activating the at least one light;

a second mechanical switch for turning power on and off to the existing second capacitor;

a remote control transmitter for remotely turning power on and off to the first mechanical switch operating the ceiling fan motor;

a remote switch housing receiver which houses the receiver in the ceiling fan for receiving wireless signal transmissions from the remote control transmitter for turning power on and off to the existing first capacitor for controlling operating speeds for the ceiling fan motor, and for turning power on and off to the existing second capacitor for activating the at least one light, wherein the remote switch housing receiver solely uses the existing first capacitor and the existing second capacitor without using any additional capacitors, and wherein the remote control transmitter further remotely activates the at least one light by turning power on an off to the existing second capacitor; the remote switch housing receiver is mounted in a fan switch box housing on which both the first mechanical switch and the second mechanical switch is attached, which is located below the ceiling fan blades, wherein the remote switch housing receiver is a replaceable rectangular box size of approximately 2 inches by approximately 1.5 inches by approximately 1 inch; a circuit inside the ceiling fan which controls fan speeds and an antenna to communicate with the transmitter, and wherein a control unit translates incoming signals from the transmitter and directs outgoing commands to a printed circuit board and a memory chip that maintains signal pairing to the transmitter and last settings of the fan and the light.

Another embodiment of a switch housing remote control system for ceiling fans, includes: a ceiling fan motor with ceiling fan blades and a receiver; an existing first capacitor integrated with the ceiling fan motor and the receiver for controlling operating speeds for the ceiling fan motor; a first mechanical switch for turning power on and off to the existing first capacitor for controlling operating speeds for the ceiling fan motor; at least one light attached to the ceiling fan motor; an existing second capacitor integrated with the at least one light for activating the at least one light; a second mechanical switch for turning power on and off to the existing second capacitor; a remote control transmitter for remotely turning power on and off to the first mechanical switch operating the ceiling fan motor; a remote switch housing receiver which houses the receiver in the ceiling fan for receiving wireless signal transmissions from the remote control transmitter for turning power on and off to the existing first capacitor for controlling operating speeds for the ceiling fan motor, and for turning power on and off to the existing second capacitor for activating the at least one light, wherein the remote switch housing receiver solely uses the existing first capacitor and the existing second capacitor without using any additional capacitors, and wherein the remote control transmitter further remotely activates the at least one light by turning power on an off to the existing second capacitor; the remote switch housing receiver is mounted in a fan switch box housing on which both the first mechanical switch and the second mechanical switch is attached, wherein the remote switch housing receiver is a replaceable receiver having a size up to approximately 2 inches by approximately 1.5 inches by approximately 1 inch; and a circuit inside the ceiling fan which controls fan speeds, and an antenna to communicate with the transmitter, and wherein a control unit translates incoming signals from the transmitter and directs outgoing commands to a printed circuit board, and a memory chip that maintains signal pairing to the transmitter and last settings of the fan and the light.

Another embodiment of a switch housing remote control system for ceiling fans, includes:

a ceiling fan motor with ceiling fan blades and a receiver;

an existing first capacitor integrated with the ceiling fan motor and the receiver for controlling operating speeds for the ceiling fan motor;

a first mechanical switch for turning power on and off to the existing first capacitor for controlling operating speeds for the ceiling fan motor;

at least one light attached to the ceiling fan motor;

an existing second capacitor integrated with the at least one light for activating the at least one light;

a second mechanical switch for turning power on and off to the existing second capacitor;

a remote control transmitter for remotely turning power on and off to the first mechanical switch operating the ceiling fan motor;

a remote switch housing receiver which houses the receiver in the ceiling fan for receiving wireless signal transmissions from the remote control transmitter for turning power on and off to the existing first capacitor for controlling operating speeds for the ceiling fan motor, and for turning power on and off to the existing second capacitor for activating the at least one light, wherein the remote switch housing receiver solely uses the existing first capacitor and the existing second capacitor without using any additional capacitors, and wherein the remote control transmitter further remotely activates the at least one light by turning power on an off to the existing second capacitor;

the remote switch housing receiver is mounted in a fan switch box housing, wherein the remote switch housing receiver is a replaceable receiver having a size up to approximately 2 inches by approximately 1.5 inches by approximately 1 inch; and a circuit inside the ceiling fan which controls fan speeds, and an antenna to communicate with the transmitter, and wherein a control unit translates incoming signals from the transmitter and directs outgoing commands to a printed circuit board, and a memory chip that maintains signal pairing to the transmitter and last settings of the fan and the light.

The switch housing receiver was designed to fit the smallest electronic enclosure utilized on a ceiling fan.

The receiver can be installed using a pin connector, allowing for easy removal and replacement.

The receiver can be hardwired to the fan using wire crimps. This can eliminate the pin connector, saving cost and space.

The receiver is designed to use the fan's existing components. Most importantly, it uses the fan's capacitor. This allows the design to omit a duplicate capacitor in the receiver, saving cost and size.

The receiver can be inside a hard plastic receiver housing. The receiver can also be shrink wrapped without the hard plastic housing to reduce its' size.

Further objects and advantages of this invention will be apparent from the following detailed description of the presently preferred embodiments which are illustrated schematically in the accompanying drawings.

BRIEF DESCRIPTION OF FIGURES

The drawing figures depict one or more implementations in accord with the present concepts, by way of example only, not by way of limitations. In the figures, like reference numerals refer to the same or similar elements.

Built in Remote C-Shaped Receiver (Over Motor)

Figure 13A:
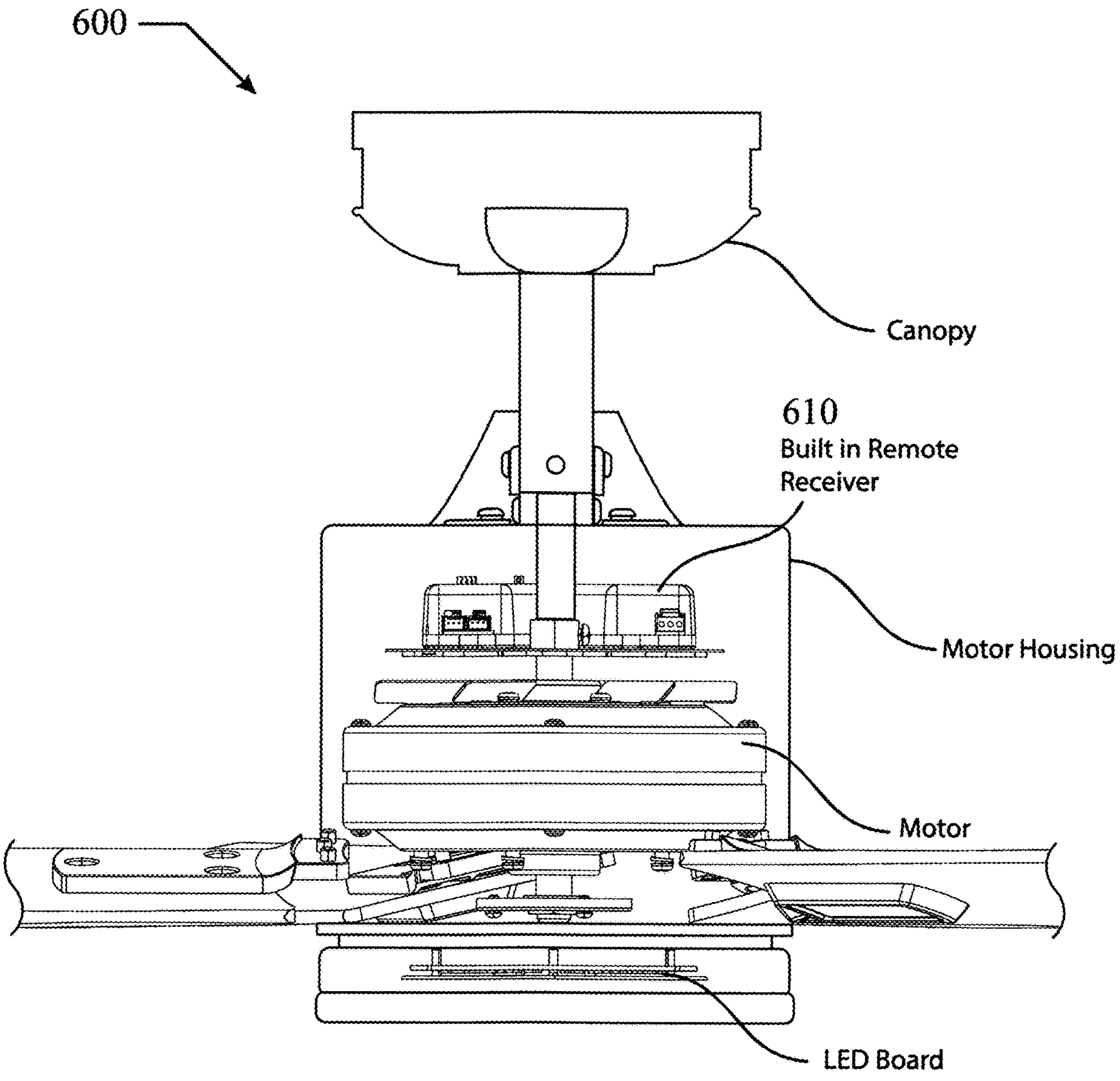

FIG. 13A is a sectional view of a typical ceiling fan with ceiling canopy and motor housing with Built In Remote C-shaped Receiver above a motor with ceiling fan blades underneath.

Figure 13B:
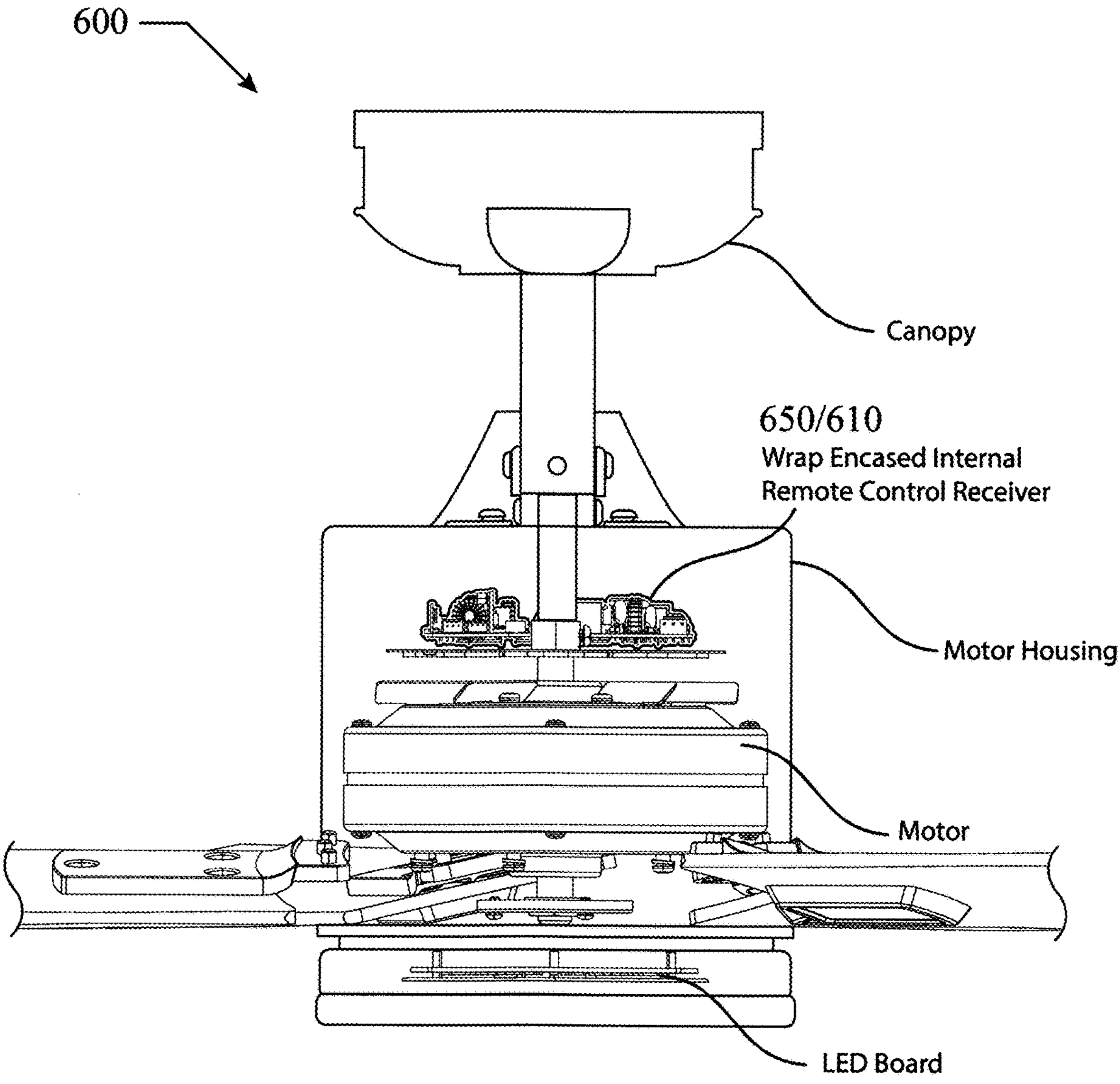

FIG. 13B is another sectional view of FIG. 13A with the Built In Remote C-shaped Receiver in a water proof encasement.

Figure 14A:
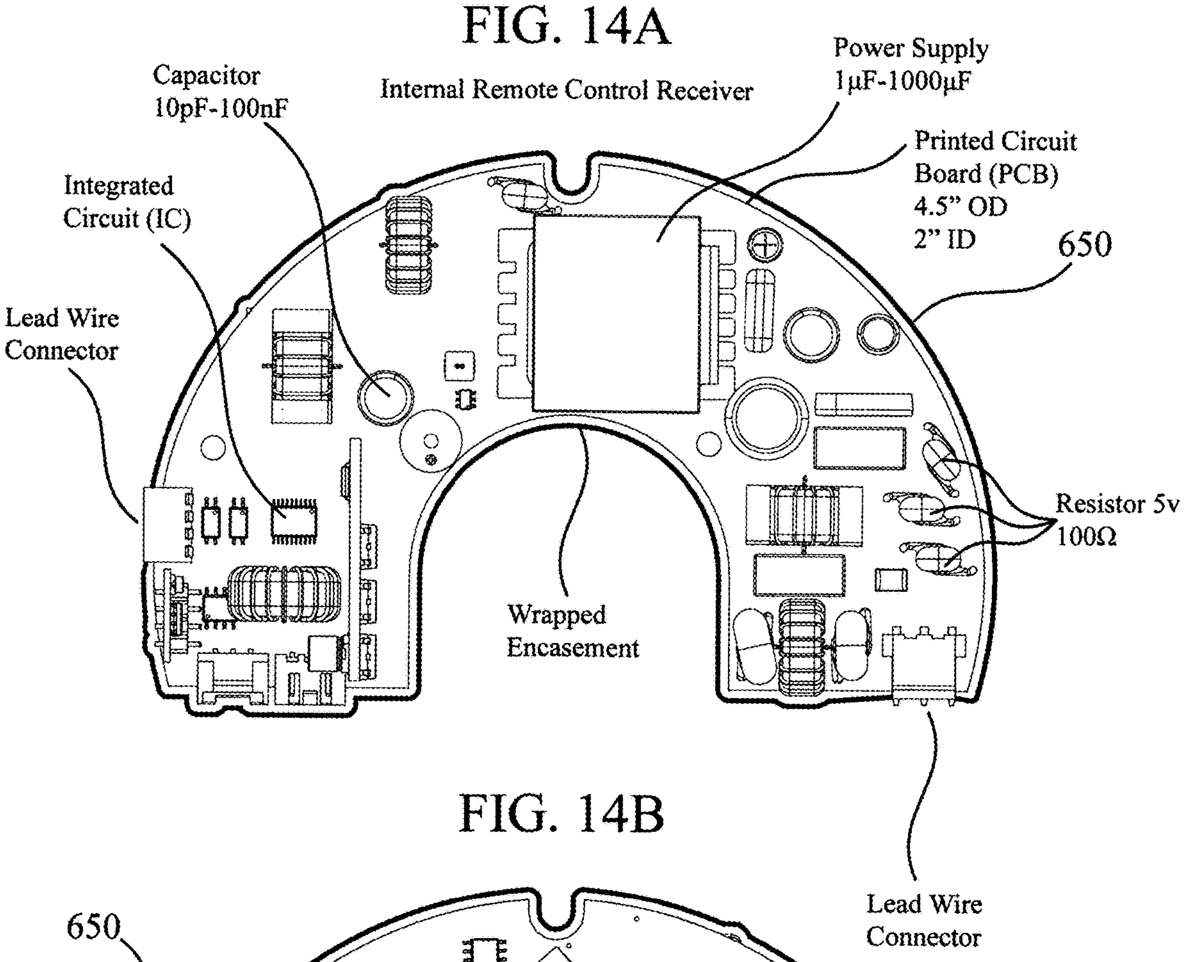

FIG. 14A is a top view of the encased Internal Remote Control C-shaped Receiver (Built In Remote Receiver) of FIGS. 13A-13B.

Figure 14B:
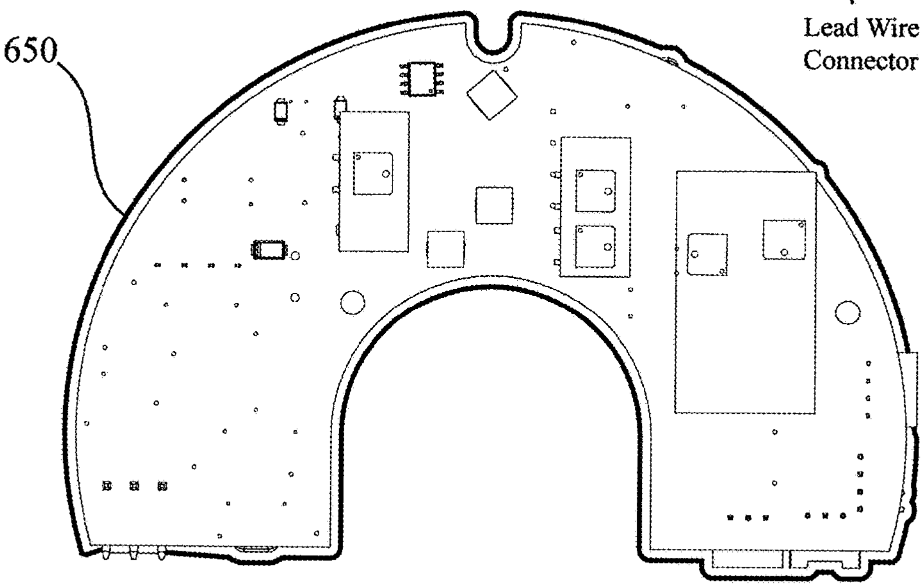

FIG. 14B is a bottom view of the encased Internal Remote Control C-shaped Receiver (Built In Remote Receiver) of FIG. 14A.

Figure 14C:
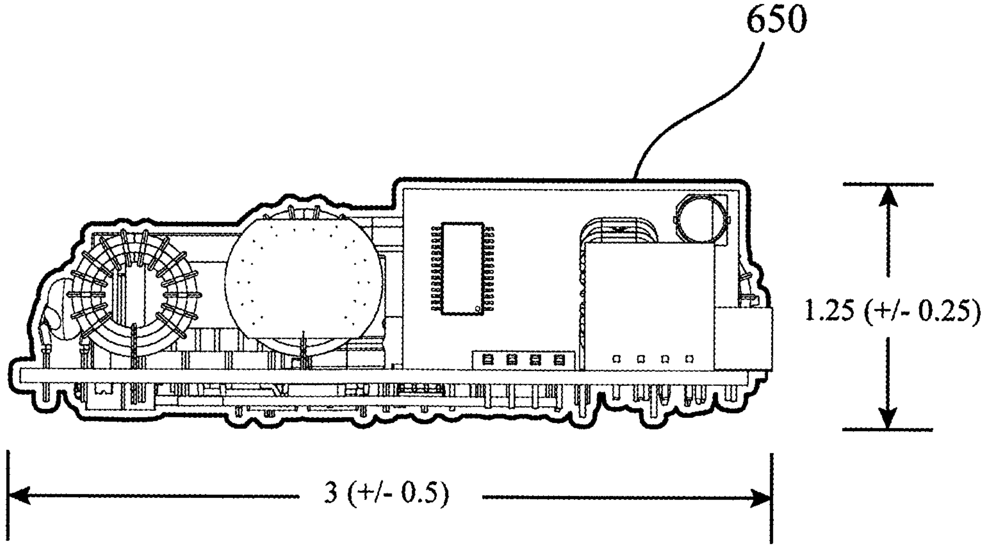

FIG. 14C is a left side view of the encased Internal Remote Control C-shaped Receiver (Built In Remote Receiver) of FIG. 14A.

Figure 14D:
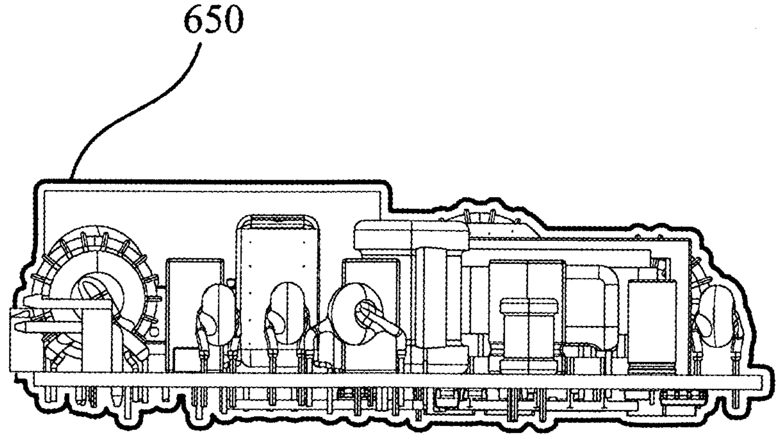

FIG. 14D is a right side view of the encased Internal Remote Control C-shaped Receiver (Built In Remote Receiver) of FIG. 14A.

Figure 14E:
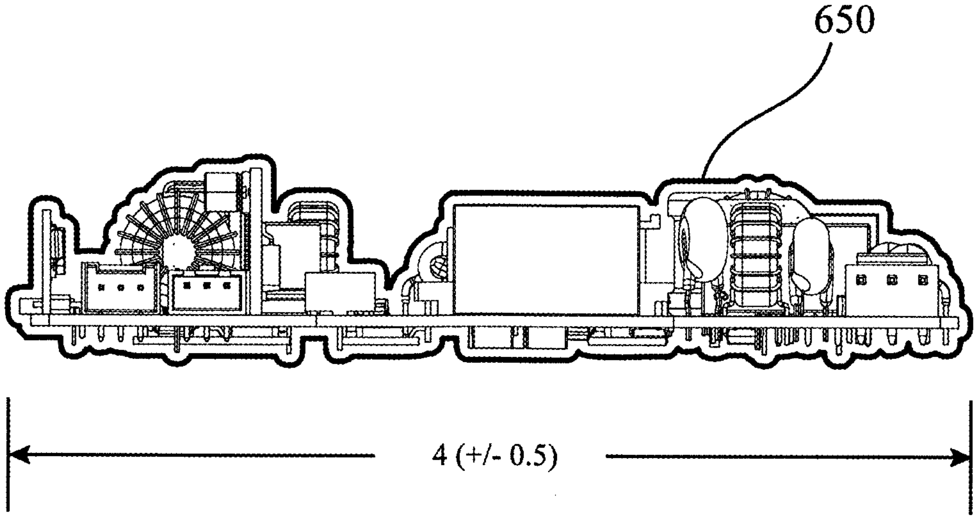

FIG. 14E is a front view of the encased Internal Remote Control C-shaped Receiver (Built In Remote Receiver) of FIG. 14A.

Figure 14F:
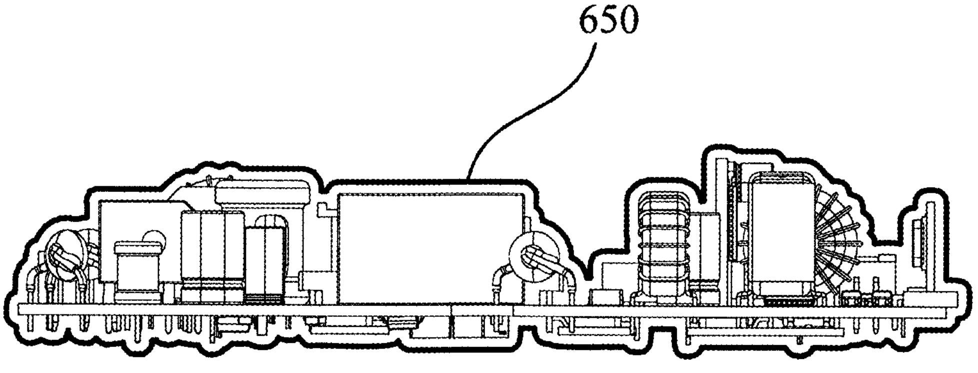

FIG. 14F is a back view of the encased Internal Remote Control C-shaped Receiver (Built In Remote Receiver) of FIG. 14A.

Figure 15A:
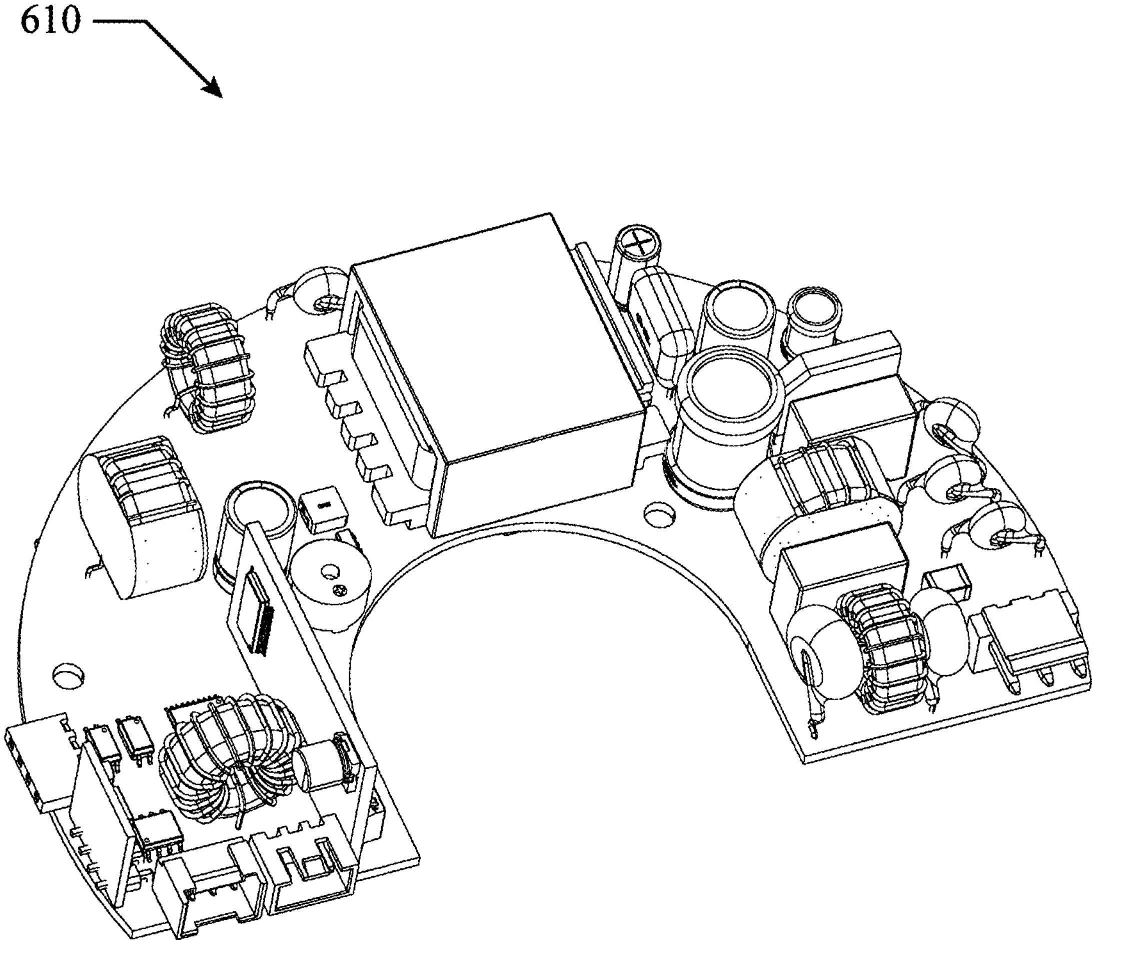

FIG. 15A is a top ISO perspective view of the Internal Remote Control C-shaped Receiver (Built In Remote Receiver) of FIG. 14A without an encasement wrapping.

Figure 15B:
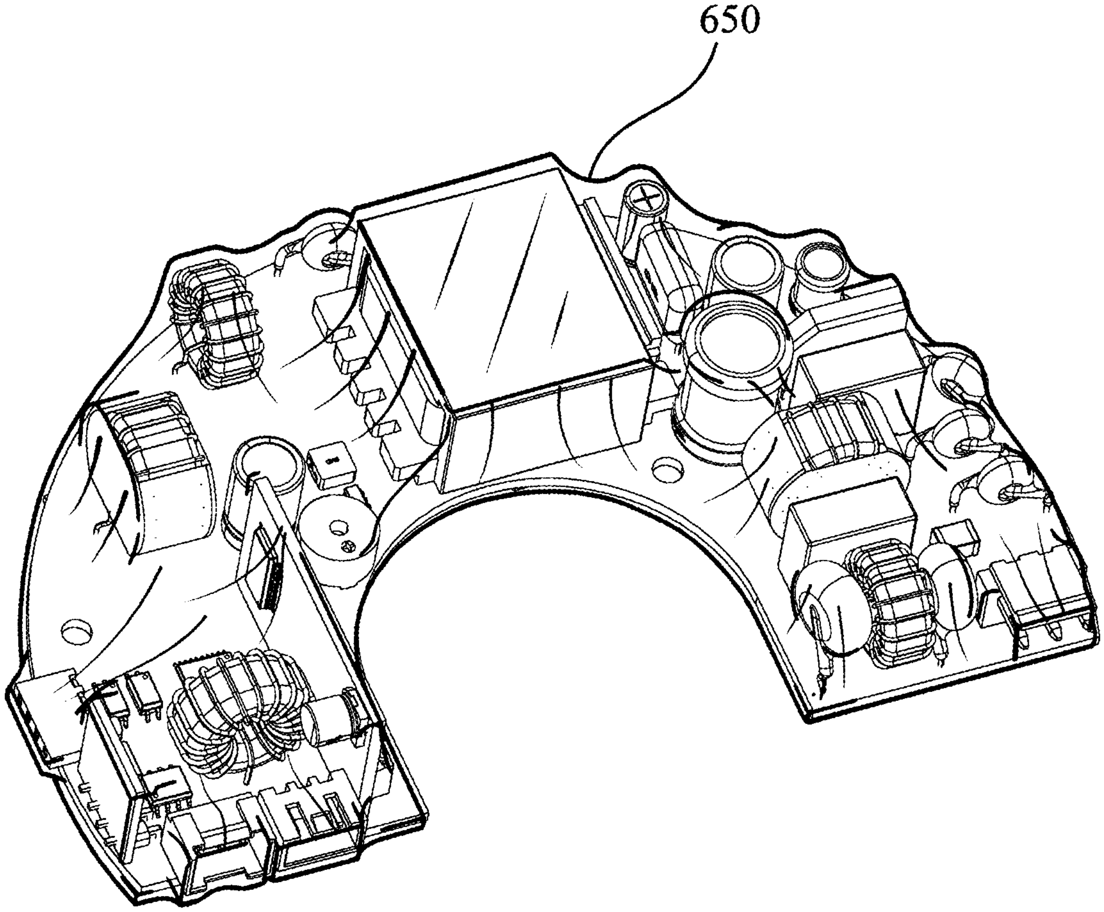

FIG. 15B is another top ISO perspective view of the Internal Remote Control C-shaped Receiver (Built In Remote Receiver) of FIG. 14A with the encasement wrapping.

Figure 16A:
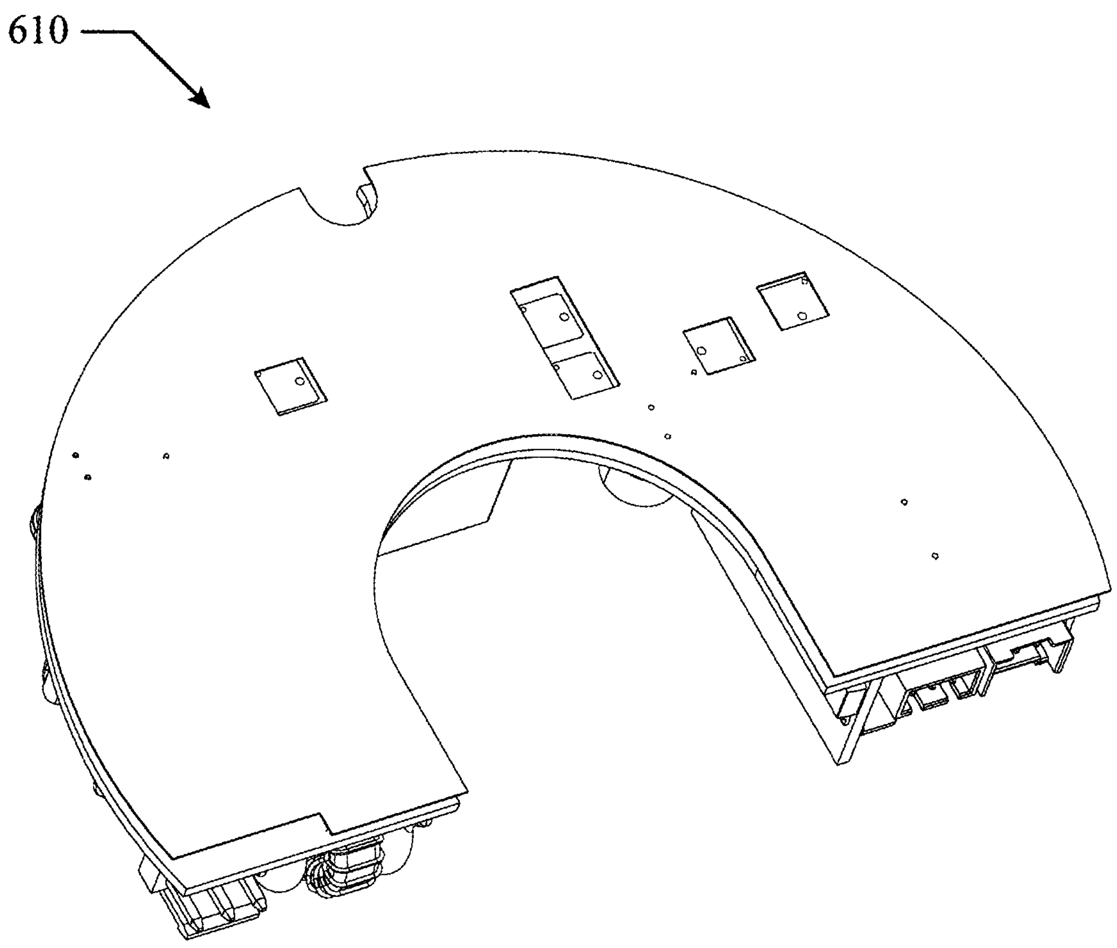

FIG. 16A is a bottom ISO perspective view of the Internal Remote Control C-shaped Receiver (Built In Remote Receiver) of FIG. 14A without an encasement wrapping.

Figure 16B:
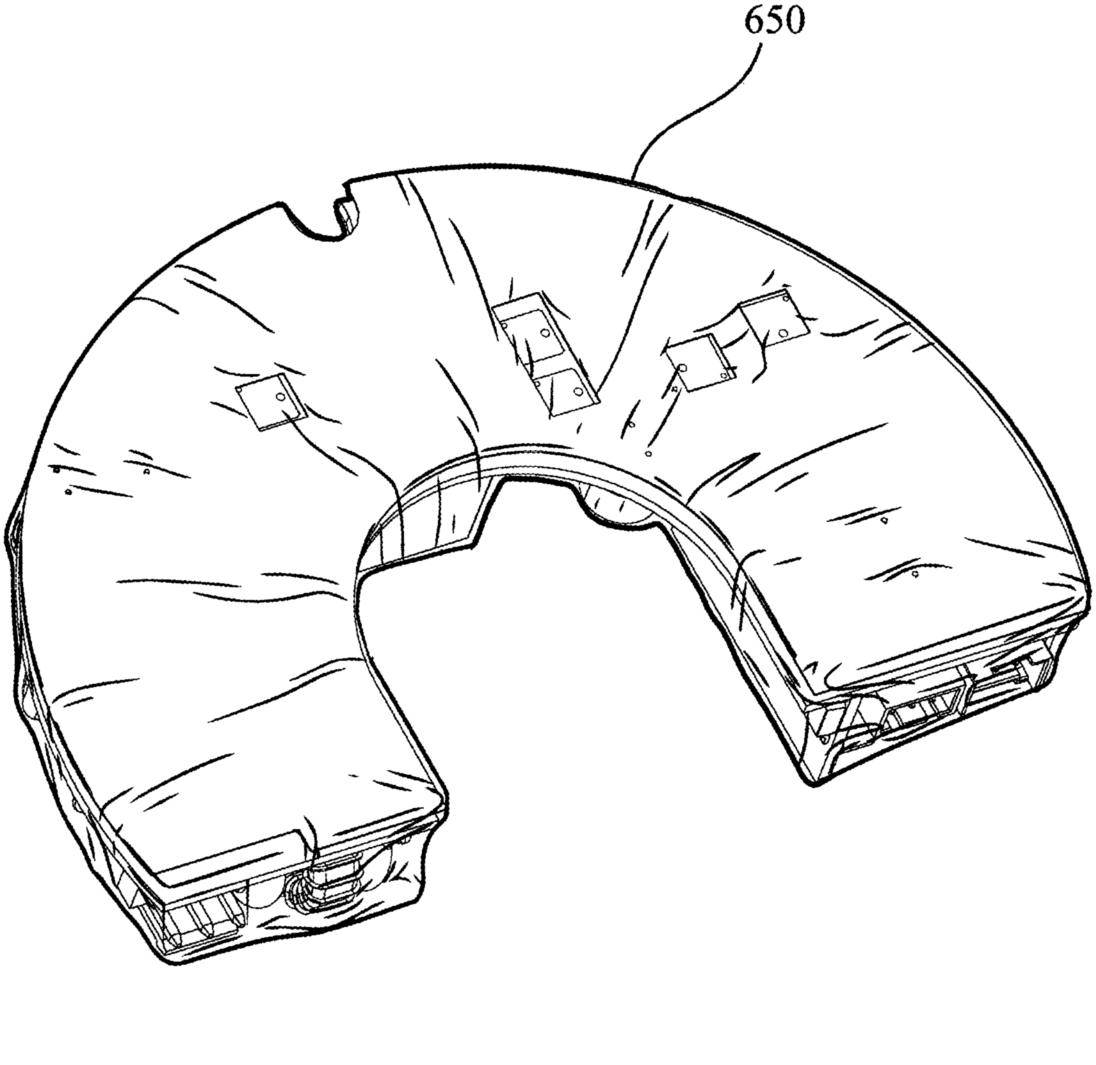

FIG. 16B is another bottom ISO perspective view of the Internal Remote Control C-shaped Receiver (Built In Remote Receiver) of FIG. 14A with the encasement wrapping.

Canopy Remote Control Receiver

Figure 17A:
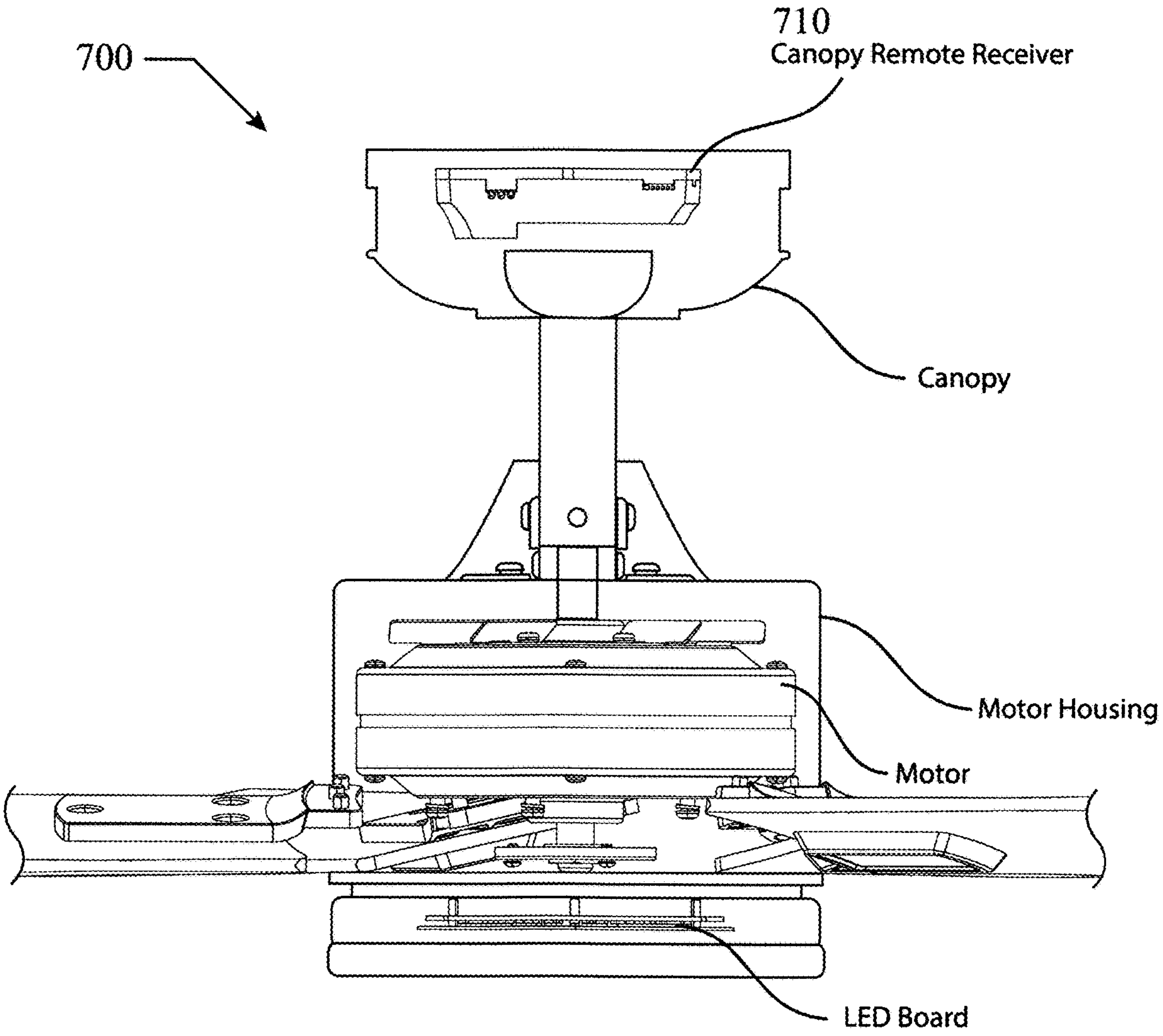

FIG. 17A is a sectional view of a typical ceiling fan with ceiling canopy remote control receiver in a ceiling canopy above a motor housing with ceiling fan blades underneath.

Figure 17B:
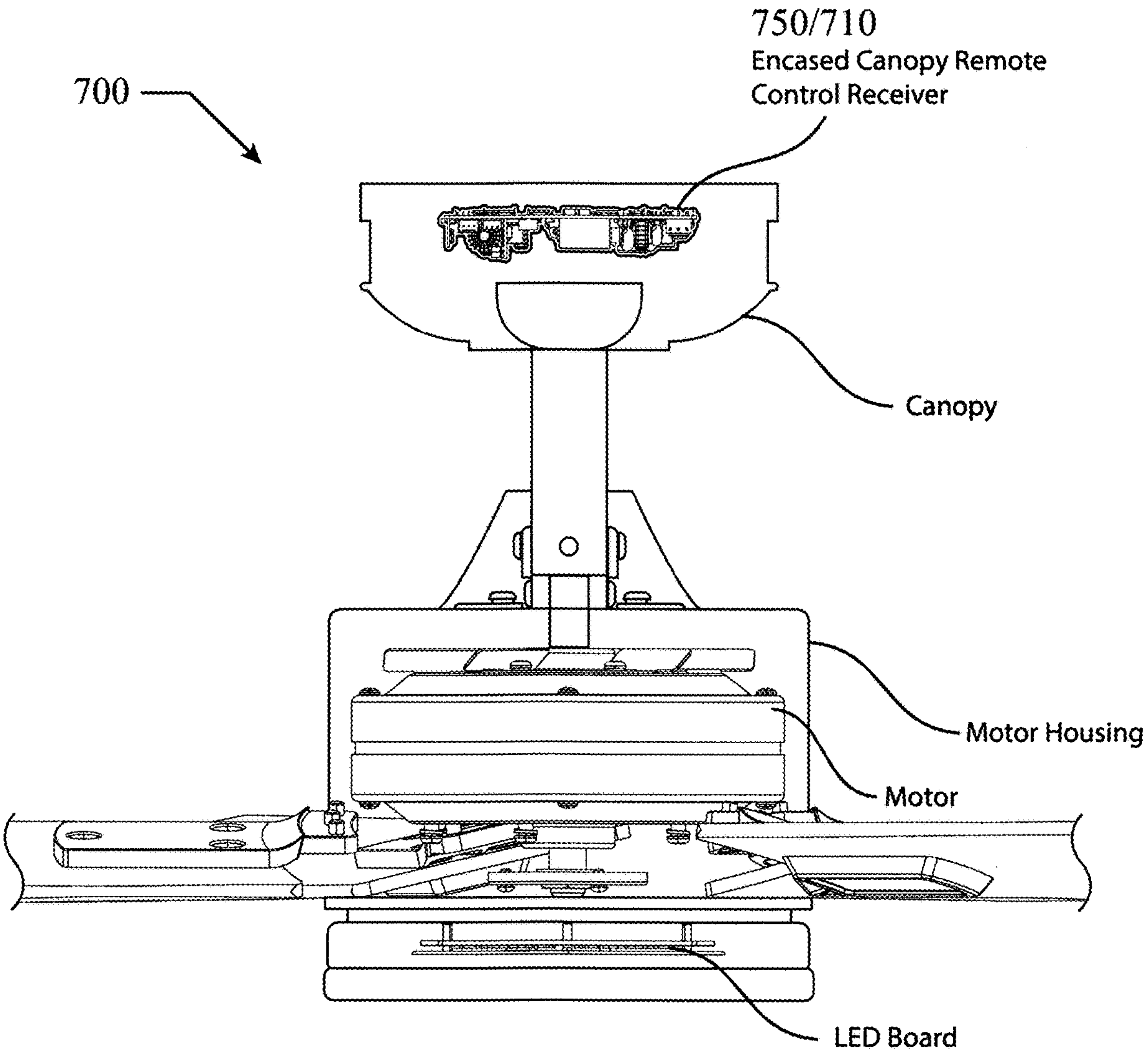

FIG. 17B is another sectional view of FIG. 17A with the canopy remote Receiver in a water proof encasement.

Figure 18A:
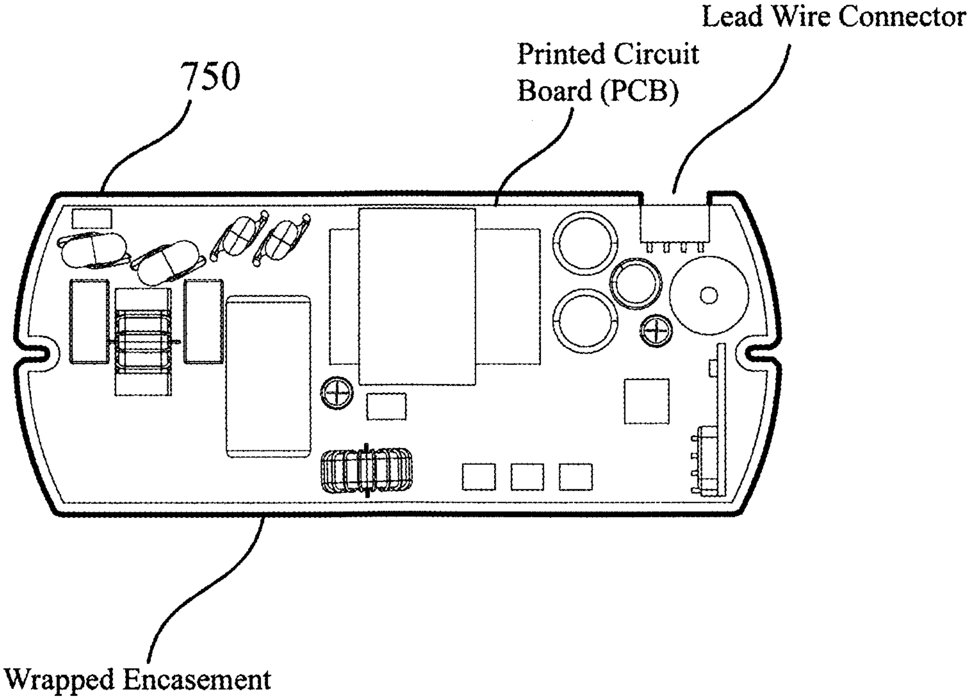

FIG. 18A a top view of the encased canopy remote Receiver of FIGS. 17A-17B.

Figure 18B:
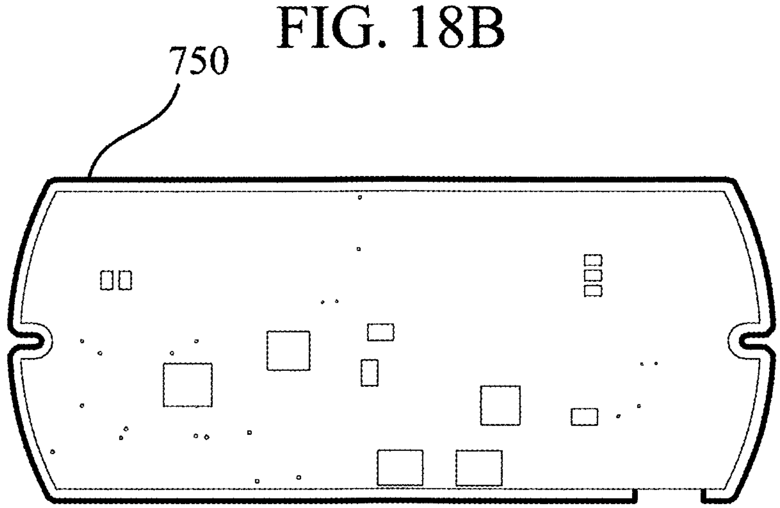
Figure 18C:
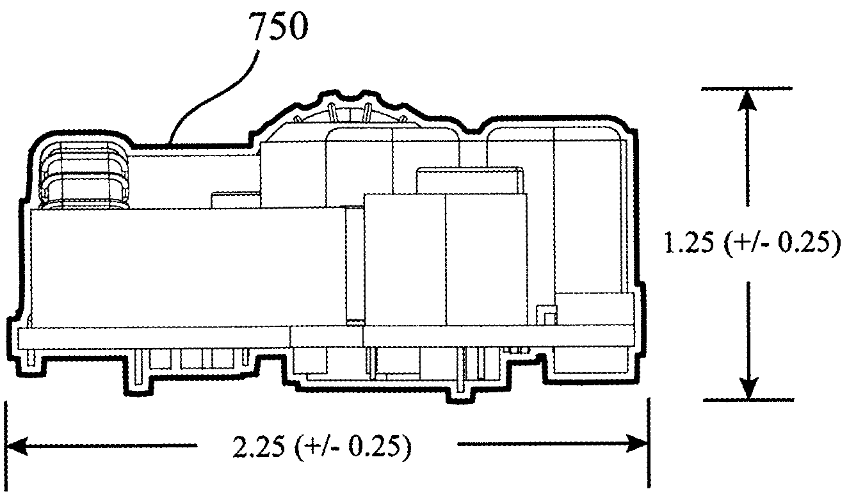

FIG. 18B is a bottom view of the encased canopy remote Receiver of FIG. 17A FIG. 18C is a left side view of the encased canopy remote receiver of FIG. 18A.

Figure 18D:
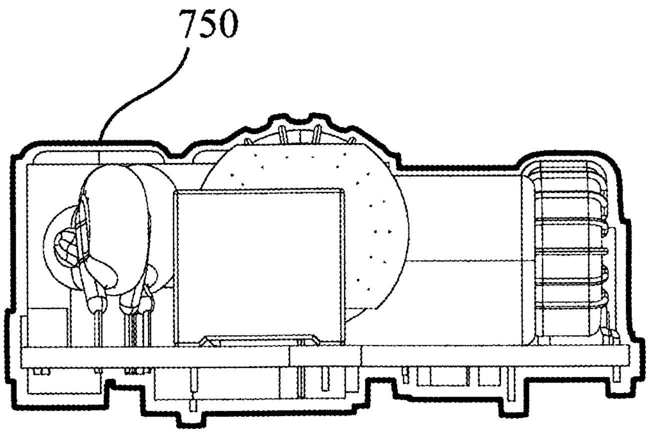

FIG. 18D is a right side view of the encased canopy remote receiver of FIG. 18A.

Figure 18E:
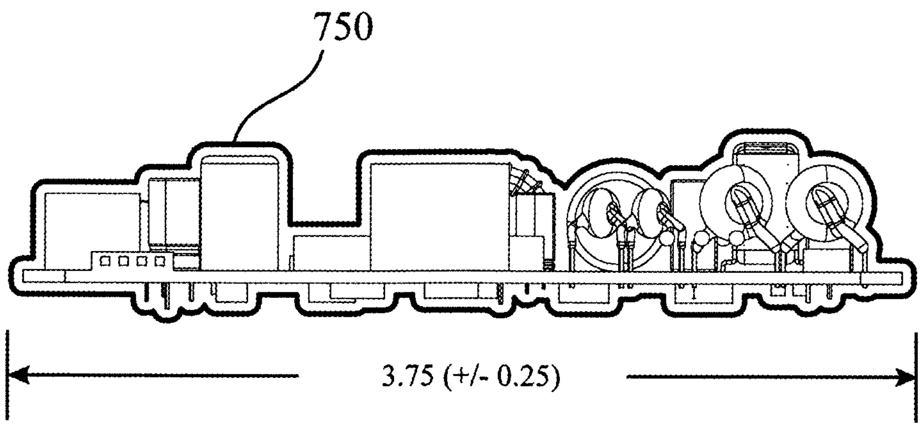

FIG. 18E is a front view of the encased canopy remote receiver of FIG. 18A.

Figure 18F:
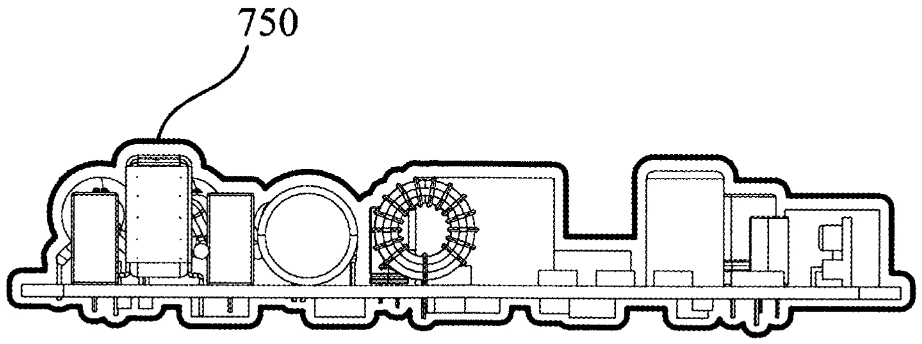

FIG. 18F is a back view of the encased canopy remote receiver of FIG. 18A.

Figure 19A:
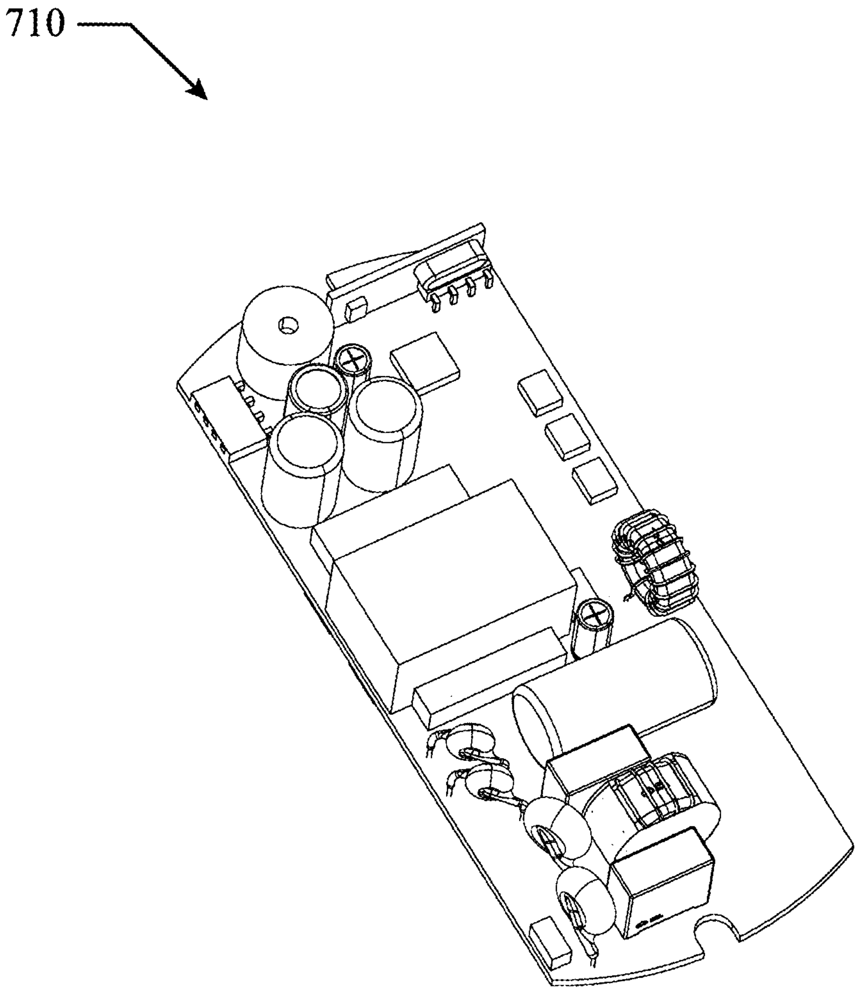

FIG. 19A is a top ISO perspective view of the canopy remote receiver of FIG. 18A without an encasement wrapping.

Figure 19B:
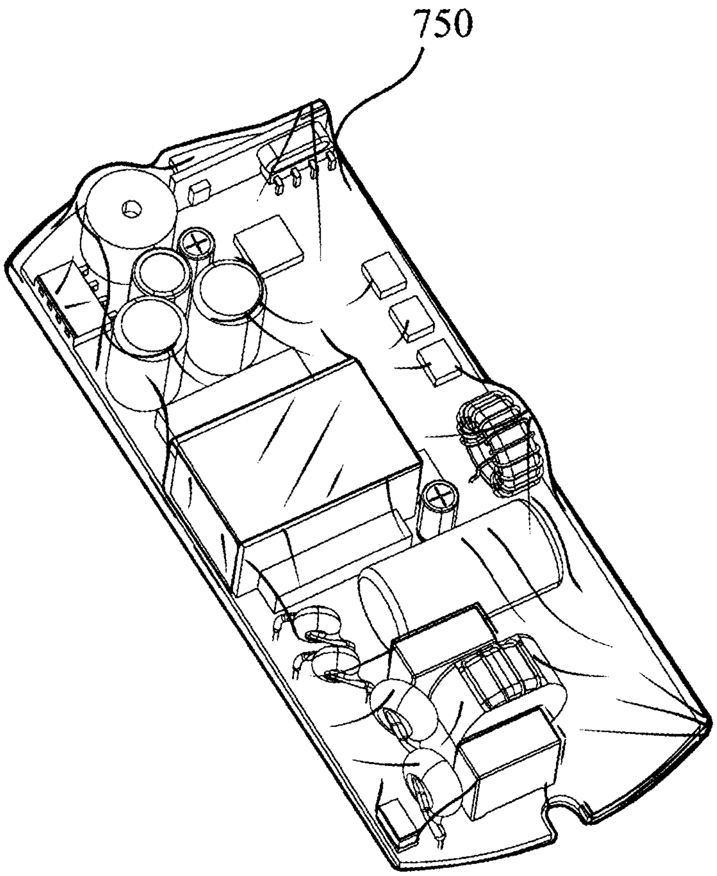

FIG. 19B is another top ISO perspective view of the canopy remote receiver of FIG. 18A with the encasement wrapping.

Figure 20A:
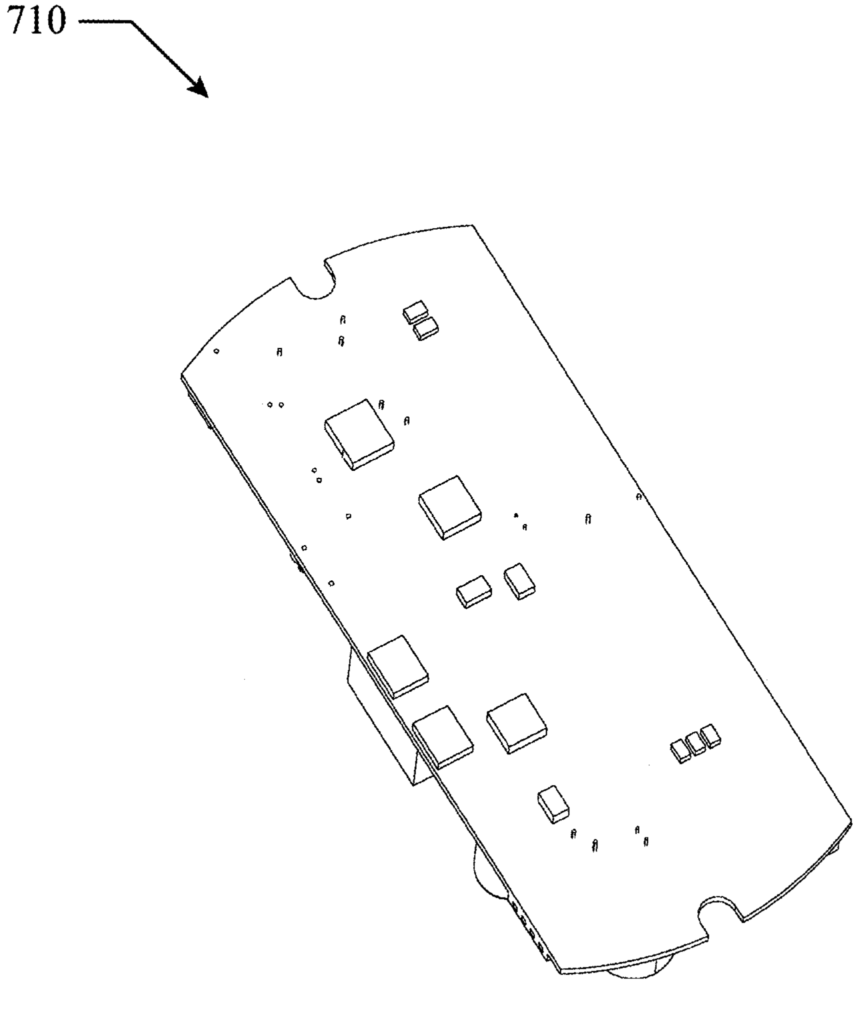

FIG. 20A is a bottom ISO perspective view of the canopy remote receiver of FIG. 18A without an encasement wrapping.

Figure 20B:
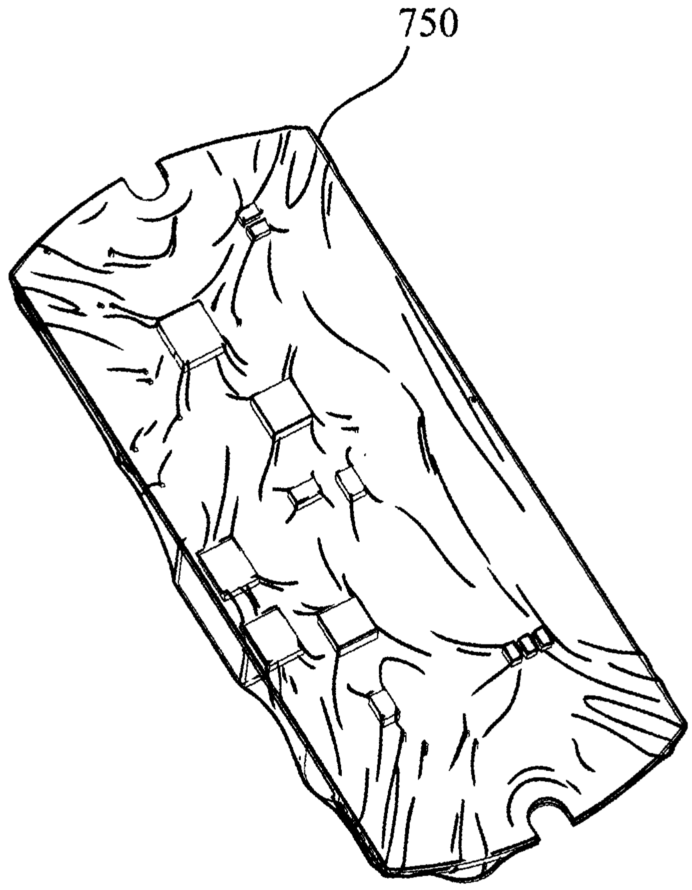

FIG. 20B is another bottom ISO perspective view of the canopy remote receiver of FIG. 18A with the encasement wrapping.

DETAILED DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The novel invention removes the extra capacitor(s) generally used inside of the remote control receiver that is normally used by the remote transmitter which utilizes an extra set of capacitors, with one of the extra capacitors for the ceiling fan speeds and another one of the extra capacitors for the lights.

Figure 1A:
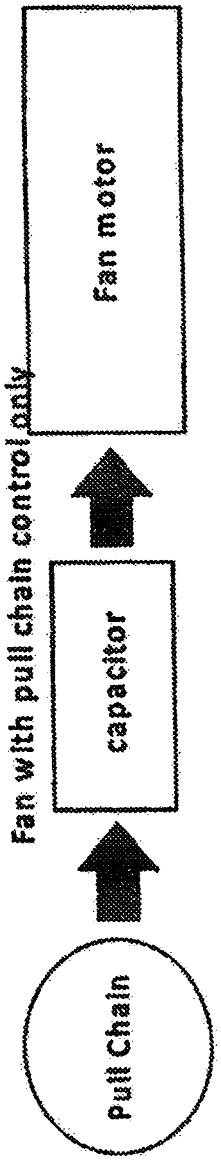
FIG. 1A (PRIOR ART)
FIG. 1A is a prior art view of a ceiling fan control only with the pull chain connected to the capacitor and the fan motor.
Figure 1B:
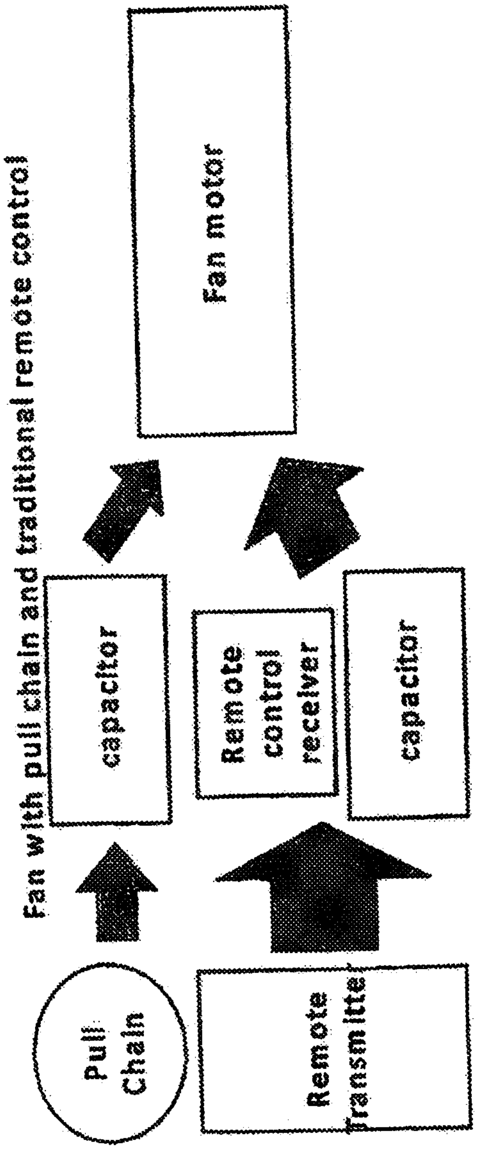
FIG. 1B (PRIOR ART)
FIG. 1B is another prior art view of a traditional ceiling fan using a separate capacitor for the pull chain and a separate capacitor for the remote control receiver, both with the fan motor.
Figure 3:
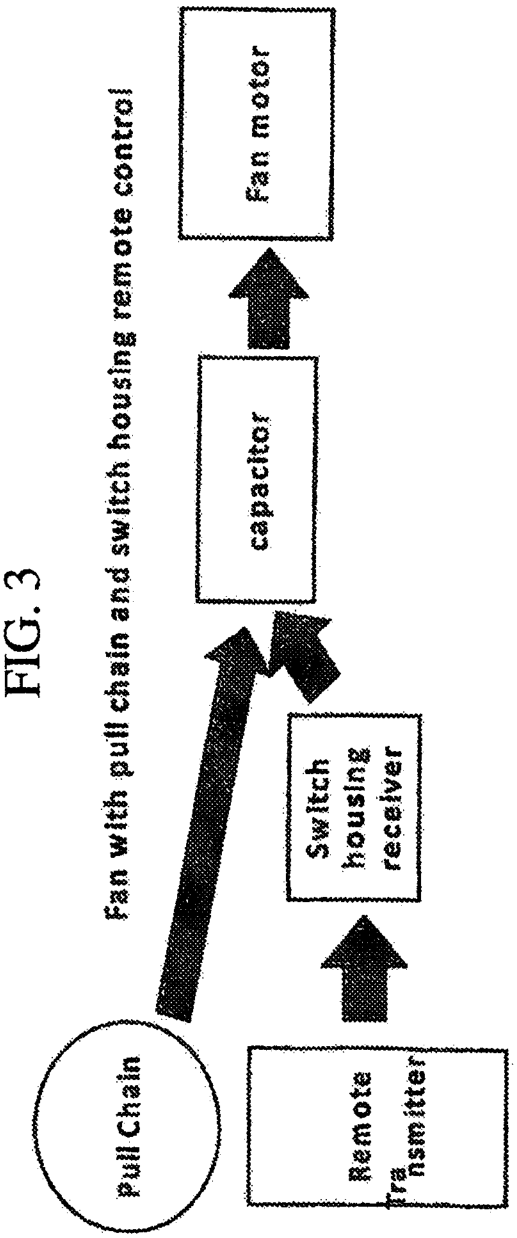
FIG. 3 is a flow chart of the novel circuit (shown more in detail in reference to FIGS. 4A-4D) which is an improvement on FIG. 1 where the pull chain and remote control and switch housing using the same capacitor(s) for controlling the fan motor.

FIG. 3 is a flow chart of the novel circuit (shown more in detail in reference to FIGS. 4A-4D) which is an improvement on FIG. 1A where the pull chain and remote control and switch housing using the same capacitor(s) for controlling the fan motor.

The exiting capacitor(s) can be a set having one capacitor for controlling the ceiling fan speed from the pull chain and another capacitor for controlling the ceiling fan light(s) when using the pull chain.

FIGS. 4A-4D shows the novel circuit inside the ceiling fan. As shown an antenna is used to communicate with the remote control transmitter. With the antenna directly connected to the existing capacitors for the switches for the fan light(s) and the fan speeds.

A list of the components in FIGS. 4A-4D will now be described

C9 capacitor #9
C10 capacitor #10
C11 capacitor #11
C13 capacitor #13
C14 capacitor #14
C16 capacitor #16
C17 capacitor #17
C18 capacitor #18
C19 capacitor #19
C21 capacitor #21
C22 capacitor #22
C23 capacitor #23
C26 capacitor #26
C28 capacitor #28
C29 capacitor #29
C35 capacitor #35
C37 capacitor #37
CX1 line filter
L10 line coil
TP1 lead to power
R1 resistor #1
R2 resistor #2
R3 resistor #3
R4 resistor #4
R6 resistor #6
R11 resistor #11
R19 resistor #19
R30 resistor #30
R31 resistor #31
R32 resistor #32
R33 resistor #33
R37 resistor #37
R38 resistor #38
U4 'U' numbers are unit (part) location markers
Q1 Inductor #1
Q2 Inductor #2
D1 diode #1
D2 diode #2
D3 diode #3
D4 diode #4
D5 diode #5
D10 diode #10
D11 diode #11
L1 line coil
NR1 variable resistor
TNR1 terminal #1
TNR2 terminal #2
TRIAC1 Triac switch #1
TRIAC2 Triac switch #2
TRIAC3 Triac switch #3

Figure 4A:
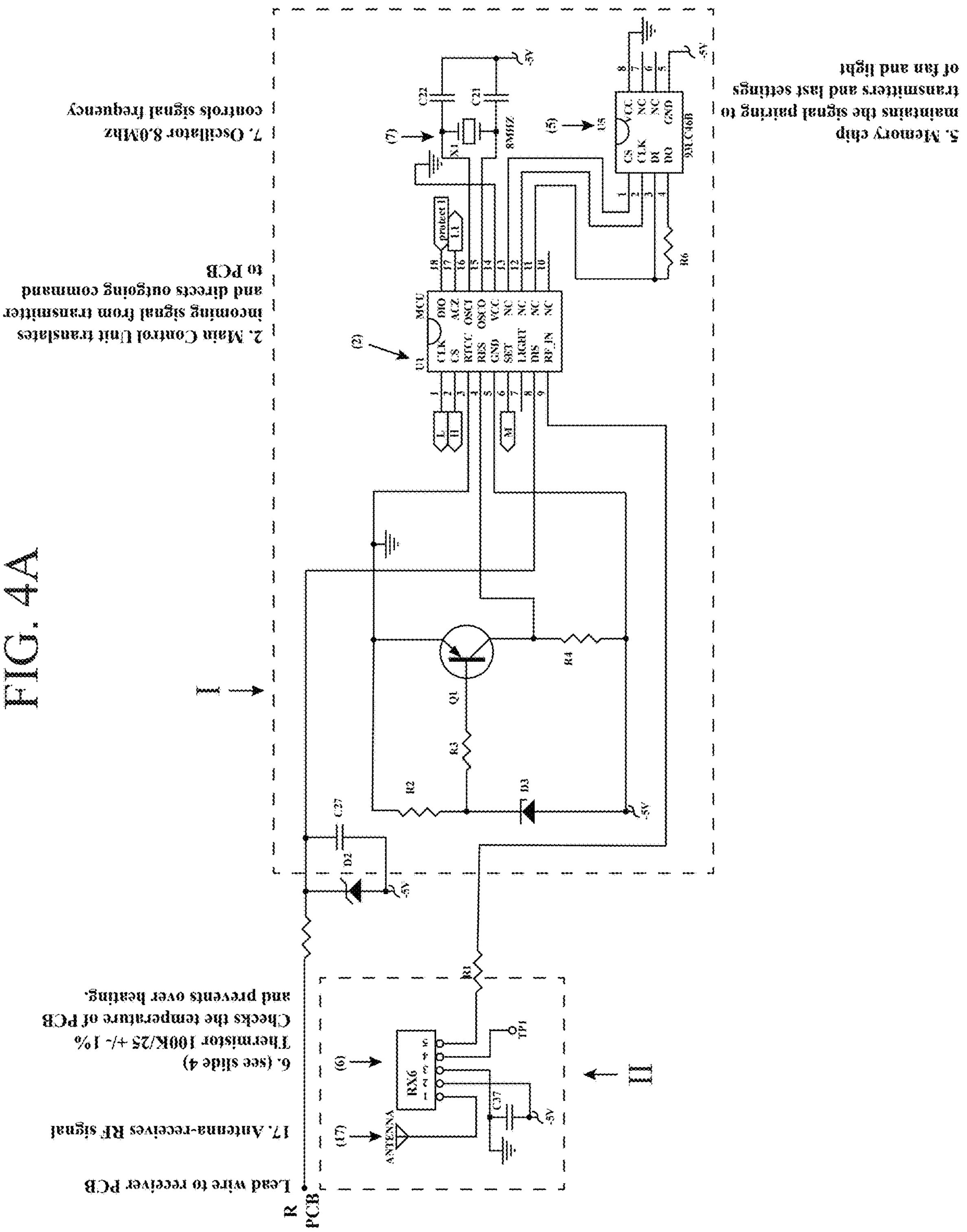
FIG. 4A shows the novel part of the circuit inside the ceiling fan which controls fan speeds and the circuit part having the antenna to communicate with the transmitter.

FIG. 4A shows the novel component part I of the circuit inside the ceiling fan which controls fan speeds and the circuit part II having the antenna to communicate with the transmitter.

Component (2) is the main control unit which translates incoming signals from the transmitters and directs outgoing commands to the PCB (printed circuit board).

Component (5) is a memory chip that maintains the signal pairing to transmitters and last settings of the fan and the light.

Component (6) refers to the Thermistor 100K/25+-1%, which checks the temperature of the PCB (printed circuit board) and prevents overheating.

Component (7) refers to the oscillator 8.0 MHz which controls signal frequency.

Component (17) refers to the antenna which receives the RF (radio frequency) signal from the remote.

Figure 4B:
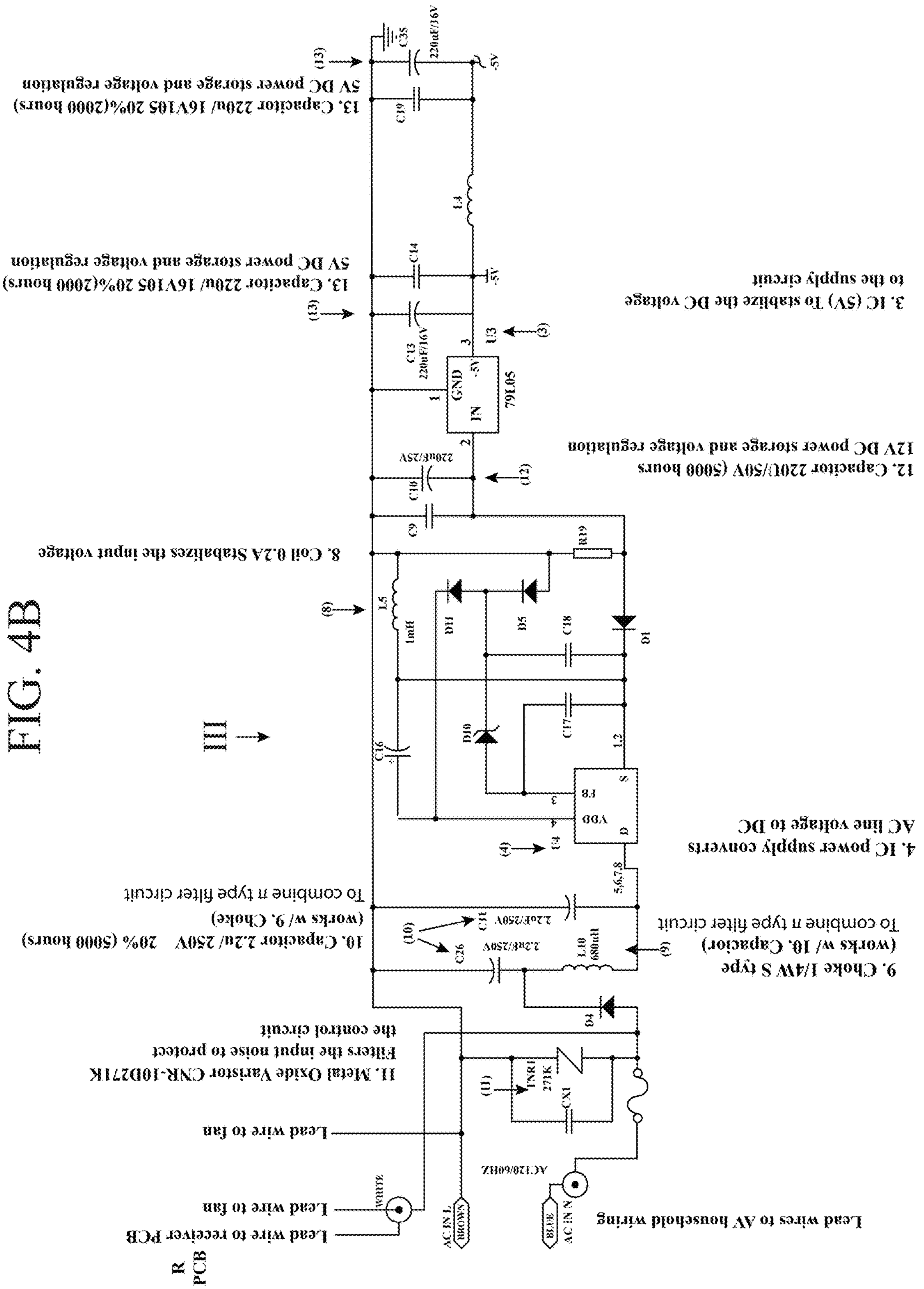
FIG. 4B shows the novel part of the circuit inside the ceiling fan that is used to control light on/off and dimming.

FIG. 4B shows the novel part III of the circuit inside the ceiling fan that is used to control light on/off and dimming. This circuit stabilizes the voltage input and output to the circuit. The stabilization helps protect the circuit from voltage spikes and drops.

Component (3) refers to IC (5V) which is for stabilizing the DC (direct current) voltage supply to the supply circuit.

Component (4) refers to the IC power supply which converts AC (alternating current) line voltage to DC (direct current).

Component (8) refers to coil 0.2 which stabilizes the input voltage.

Component (9) refers the choke 1/4 S type which works with the component (10) capacitor to combine π type filter circuit.

Component (10) refers to a capacitor 2.2 u/250V, 20% (5000 hours) with works with component (9) the choke to combine π type filter circuit.

Component (11) refers to the metal oxide varistor CNR-10D271K which filters the input noise to protect the control circuit.

Component (12) refers to capacitor 220 U/50V (5000 hours) 12V DC power storage and voltage regulation.

Component (13) (listed twice) refers to the capacitor 220 u/16V105 20% (2000 hours) 5V DC power storage and voltage regulation.

Figure 4C:
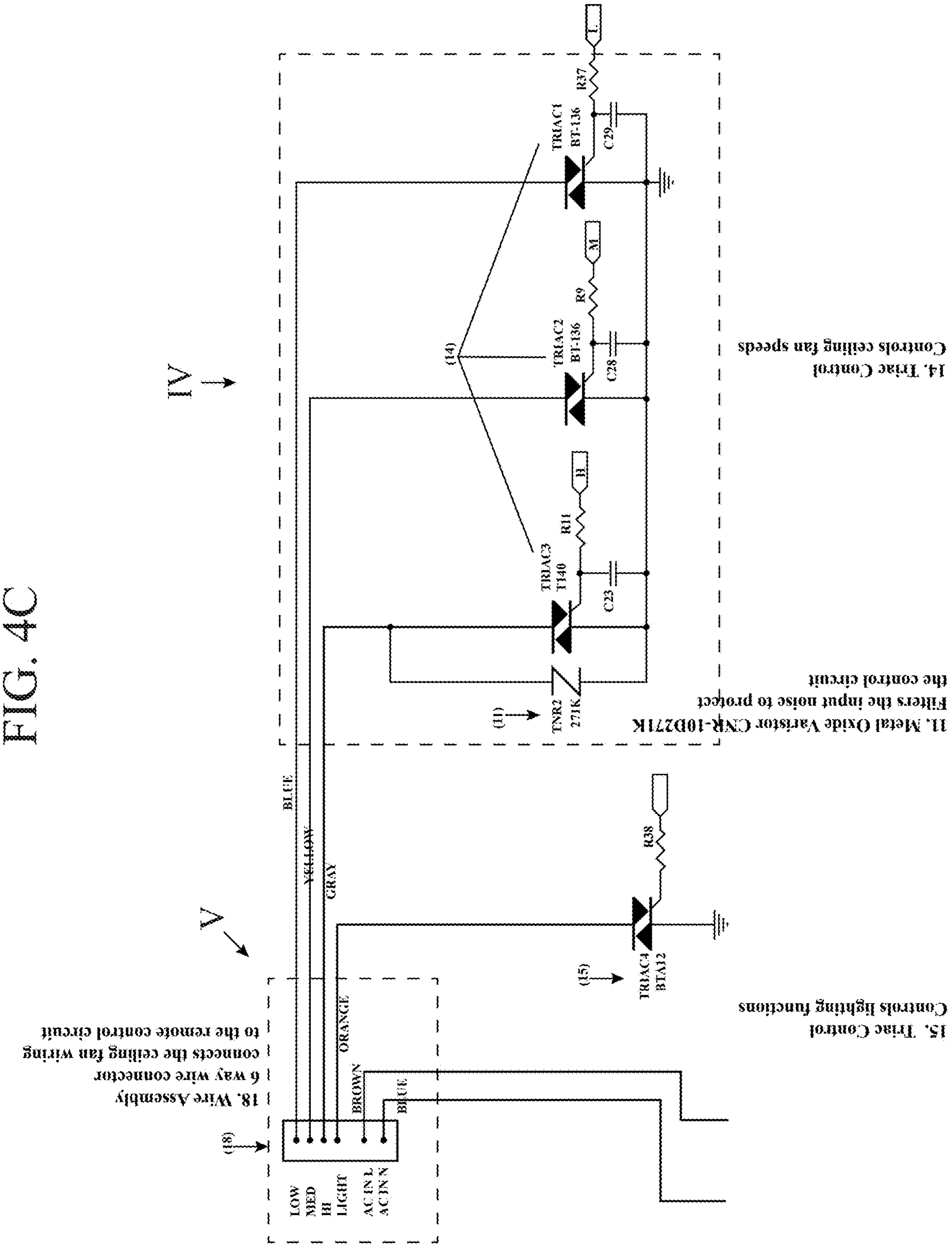
FIG. 4C shows the novel part of the circuit inside the ceiling fan with switches for light and fan speeds, and the novel part of the circuit with the connector from receiver to fan capacitors.

FIG. 4C shows the novel part IV of the circuit inside the ceiling fan with switches for light and fan speeds, and the novel part V of the circuit with the connector from receiver to fan capacitors.

Component (11) refers to the metal oxide varistor CNR-10D271K which filters the input noise to protect the control circuit.

Component 14 refers to the triac control which controls ceiling fan speeds.

Component 15 refers to the triac control which controls lighting dimming and on/off features.

Component 18 refers to the wire assembly with 6 way wire connector that connects the ceiling fan wiring to the remote control circuit and household wiring.

Figure 4D:
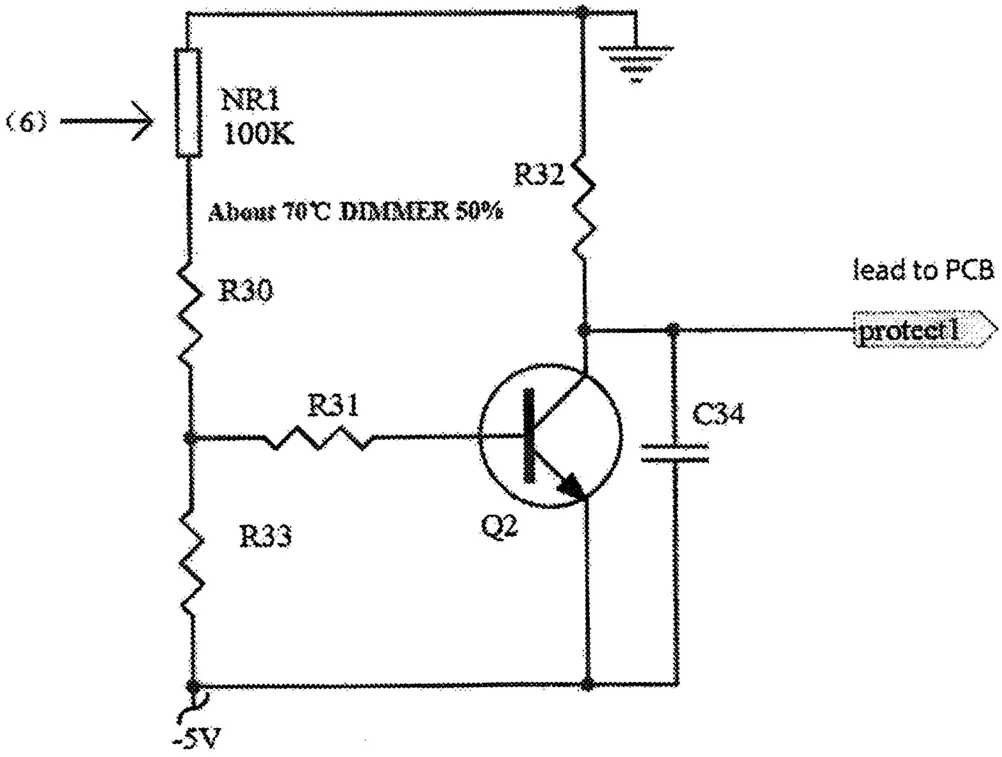
FIG. 4D shows the heat sink part of the circuit inside the ceiling fan.

FIG. 4D shows the heat sink part of the circuit inside the ceiling fan.

Component (6) refers to a thermistor 100K/25+-1%, which checks the temperature of the PCB (printed circuit board) and prevents overheating. FIG. 4D is a detail from FIG. 4A. Component 6—heat sink is in FIG. 4A. it protects the Main Control Unit and Memory from overheating.

Figure 2:
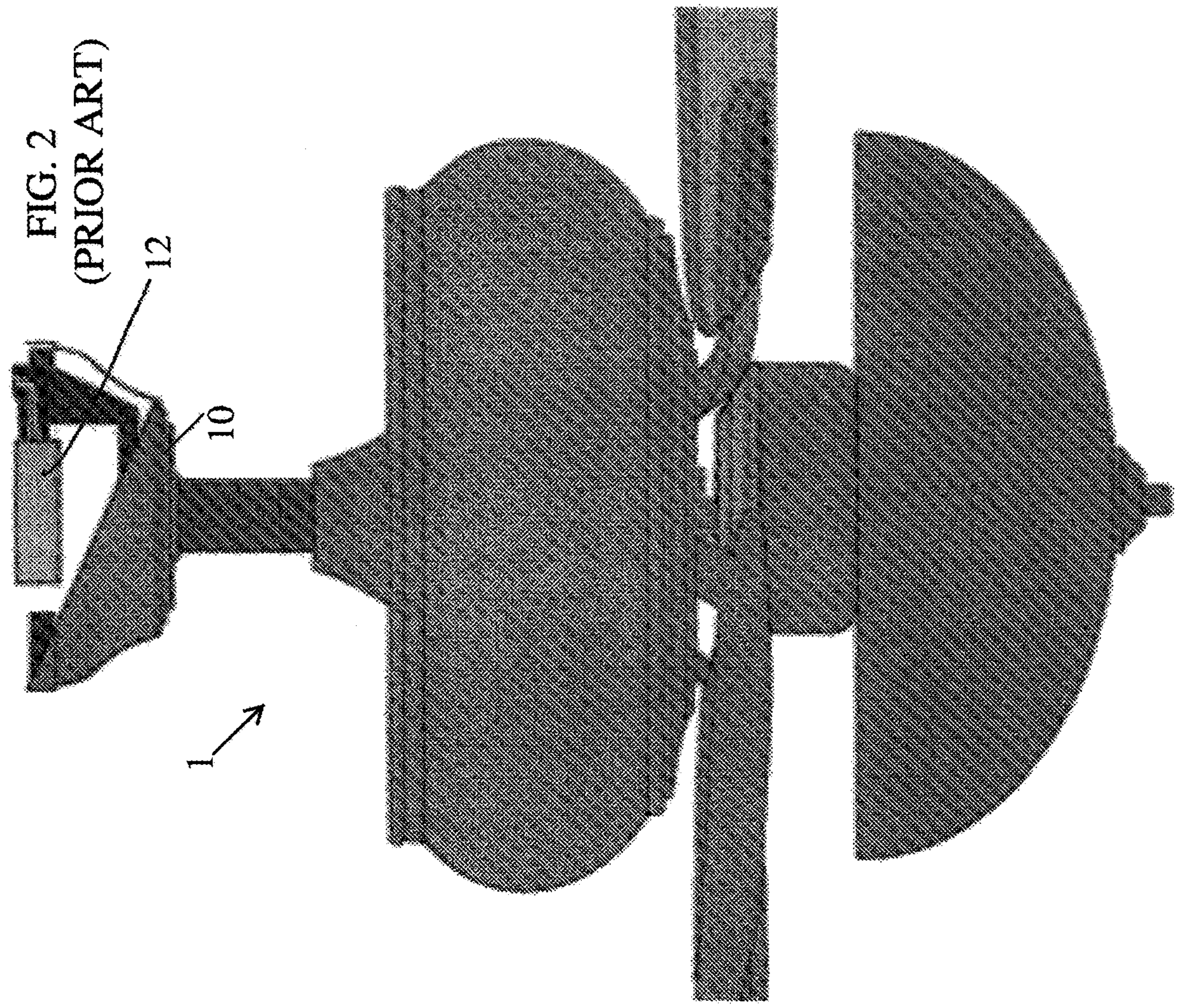
FIG. 2 (PRIOR ART)
FIG. 2 is a prior art view of a ceiling fan 1 having a remote receiver 12 installed in the canopy 10 that is mounted to a ceiling.

Unlike the prior art shown in FIG. 2, changing the location of the remote receiver from the canopy to the switch box housing, makes for adding or replacing the remote receiver easier for the consumer, since it is much lower to the ground.

Figure 5:
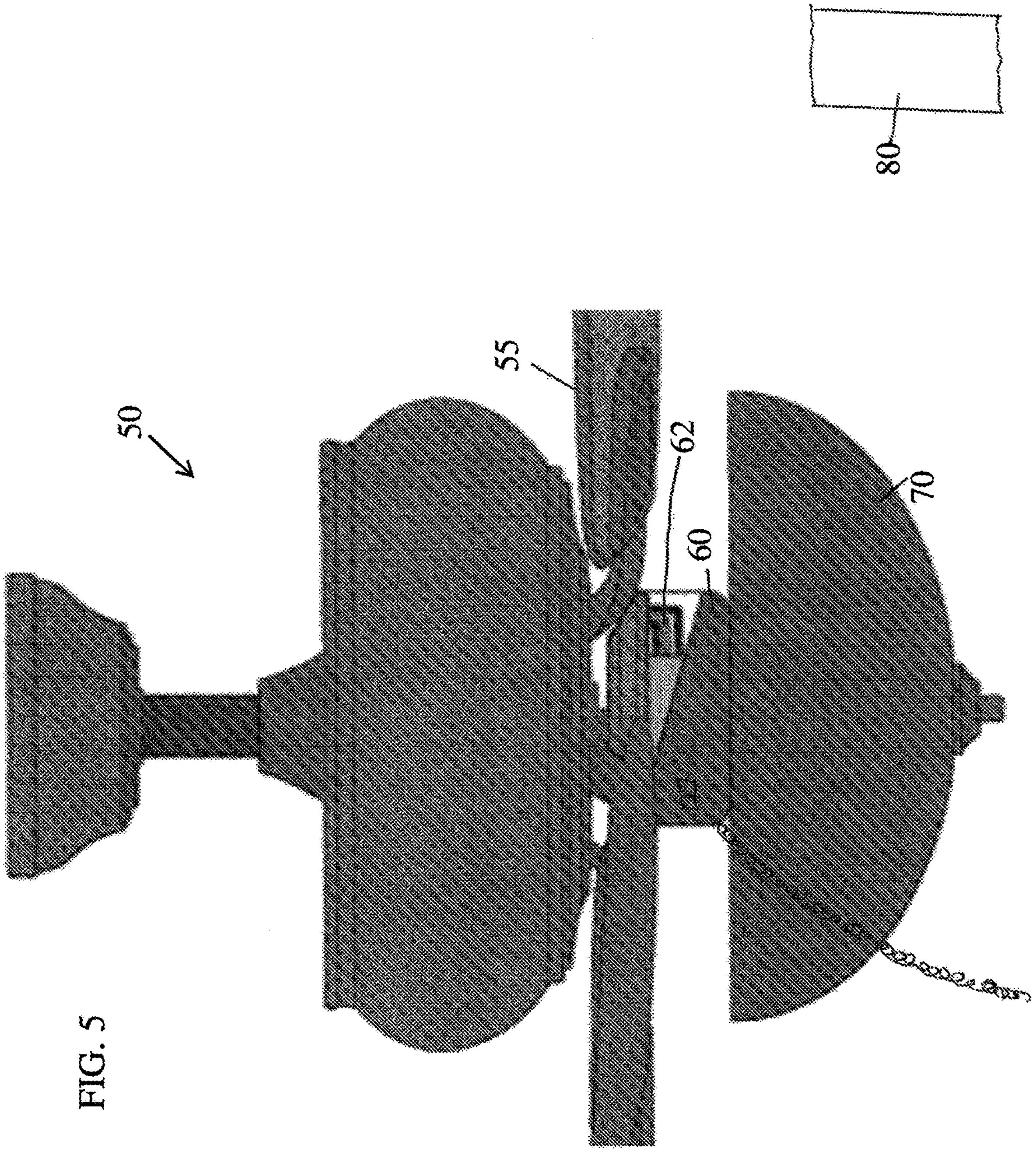
FIG. 5 shows a ceiling fan motor housing, with fan blades, and light kit with remote receiver in the switch housing below the fan blades that can incorporate the novel circuitry of FIGS. 4A-4D.

FIG. 5 shows a ceiling fan 50 with fan blades 55, and light kit 70 with the remote receiver 62 in the switch housing 60 below the fan blades that can incorporate the novel circuitry of FIGS. 4A-4D. The switch housing 60 has exterior mechanical switches for turning the fan on and off, as well as includes a pull chain attached thereto for also turning the fan on and off.

The remote receiver 62 can be located below the fan blades 55 and be close to the light kit 70. The remote receiver 62 can be sized substantially smaller than the prior art remote receiver 12 shown in FIG. 3. The novel remote receiver 62 can have a smaller rectangular box shape of approximately 2 inches by approximately 1.5 inches by approximately 1 inch. As such, the novel remote receiver 62 shown in FIG. 5 can take up substantially less space since it is at least less than approximately half in size than the prior art remote receiver 12 of FIG. 3.

A remote transmitter 80 can control turning on and off the fan blades remotely, as well as speed of the rotating fans, as well as remotely turning the lights 70 on and off, as well as providing dimming controls for the lights 70.

The fan 50 with remote receiver and remote transmitter 80 and other components similar to those described in U.S. Pat. No. 5,738,496 to Mehta, which is incorporated by reference in its' entirety.

By using the existing capacitor(s) in the motor housing, this eliminates the need for separate capacitors in the switch housing for the remote receiver.

By using the existing capacitor(s) in the motor housing, this saves space that would have been needed for extra capacitors, and uses a smaller switch housing, which uses less power.

By using existing capacitors installed in the ceiling fan and shares those capacitors with existing mechanical pull chains for the ceiling fan, the result is less costly for not requiring extra capacitors.

The circuit parts in FIGS. 4A and 4B can be located inside the remote receiver 62 which would be installed inside the switch housing 60 shown in FIG. 5. The remote receiver 62 shares the same location as the capacitors that are native to the fan. This allows the remote receiver 62 to utilize the same capacitors by wiring directly into the fan's internal wiring system.

A list of components for FIGS. 6A-10 will now be described.

Figure 6D:
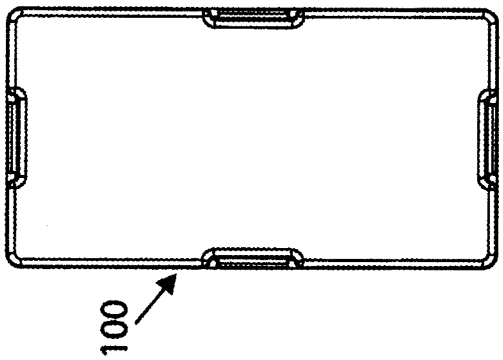
FIG. 6D is a rear view of the receiver housing of FIG. 6A.
Figure 6C:
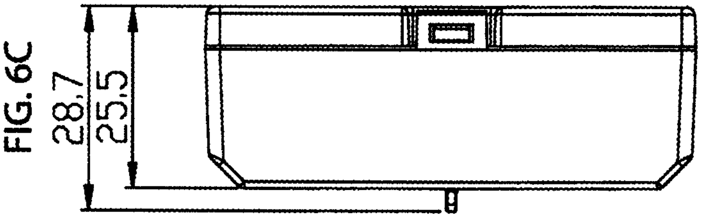
FIG. 6C is a left side view of the receiver housing of FIG. 6A.
Figure 6B:
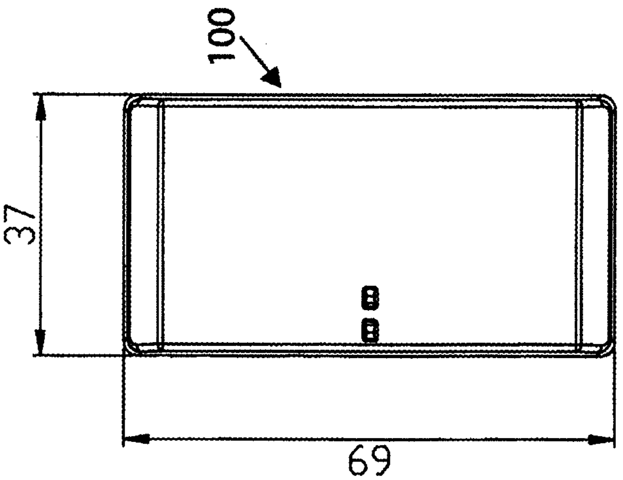
FIG. 6B is a front view of the receiver housing of FIG. 6A.
Figure 6E:
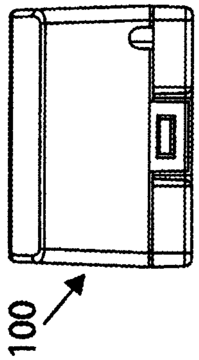
FIG. 6E is a top view of the receiver housing of FIG. 6A.
Figure 6A:
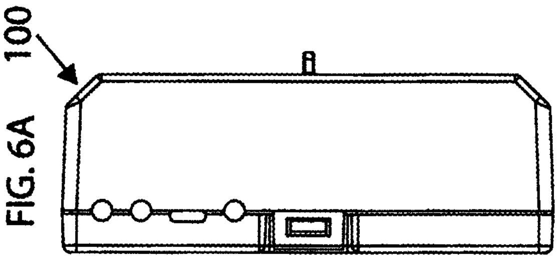
FIG. 6A is a right side view of a small remote receiver housing.

100 small remote receiver housing
200 smaller remote receiver housing
210 modular connector
220 RF antenna
230 WIFI antenna
250 shrink wrap
300 switch housing
310 pin connector
320 reverse switch
330 wire crimp
350 capacitor for switch housing
410 first light cup
420 second light cup
430 third light cup FIG. 6A is a right side view of a small remote receiver housing 100. FIG. 6B is a front view of the receiver housing 100 of FIG. 6A. FIG. 6C is a left side view of the receiver housing 100 of FIG. 6A. FIG. 6D is a rear view of the receiver housing 100 of FIG. 6A. FIG. 6E is a top view of the receiver housing 100 of FIG. 6A.

Referring to FIGS. 6A-6E, the remote receiver housing 100 can have a width of approximately 37 mm, and a length of approximately 69 mm, with a narrow depth of approximately 25.5 mm and a longer depth of approximately 28.7 mm which covers a clip to hold the antenna in place.

Figure 7D:
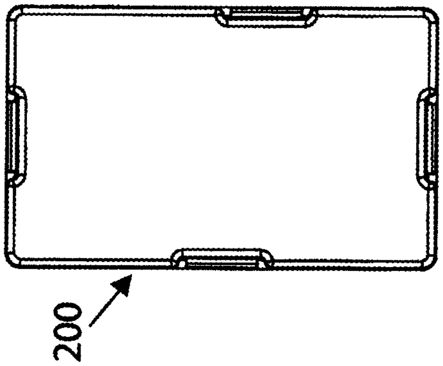
FIG. 7D is a rear view of the receiver housing of FIG. 7A.
Figure 7C:
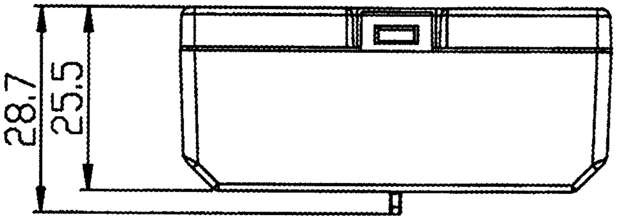
FIG. 7C is a left side view of the receiver housing of FIG. 7A.
Figure 7B:
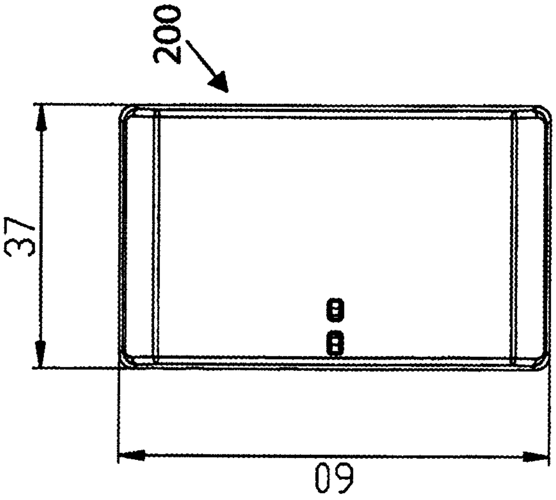
FIG. 7B is a front view of the receiver housing of FIG. 7A.
Figure 7E:
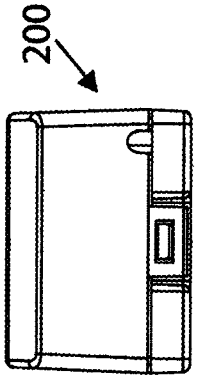
FIG. 7E is a top view of the receiver housing of FIG. 7A.
Figure 7A:
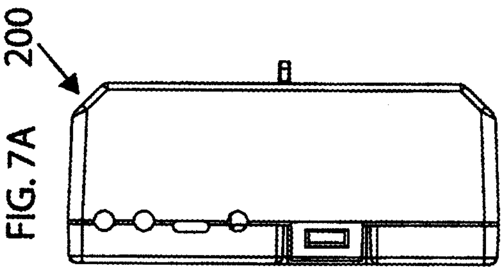
FIG. 7A is a right side view of a smaller remote receiver housing.

FIG. 7A is a right side view of a smaller remote receiver housing 200. FIG. 7B is a front view of the receiver housing 200 of FIG. 7A. FIG. 7C is a left side view of the receiver housing 200 of FIG. 7A. FIG. 7D is a rear view of the receiver housing 200 of FIG. 7A. FIG. 7E is a top view of the receiver housing 200 of FIG. 7A.

Referring to FIGS. 7A-7E, the smaller remote receiver housing 200 can have a width of approximately 30 mm, a length of approximately 60 mm, with a narrow depth of approximately 22.5 mm and a longer depth of approximately 25.5 mm.

Figure 8:
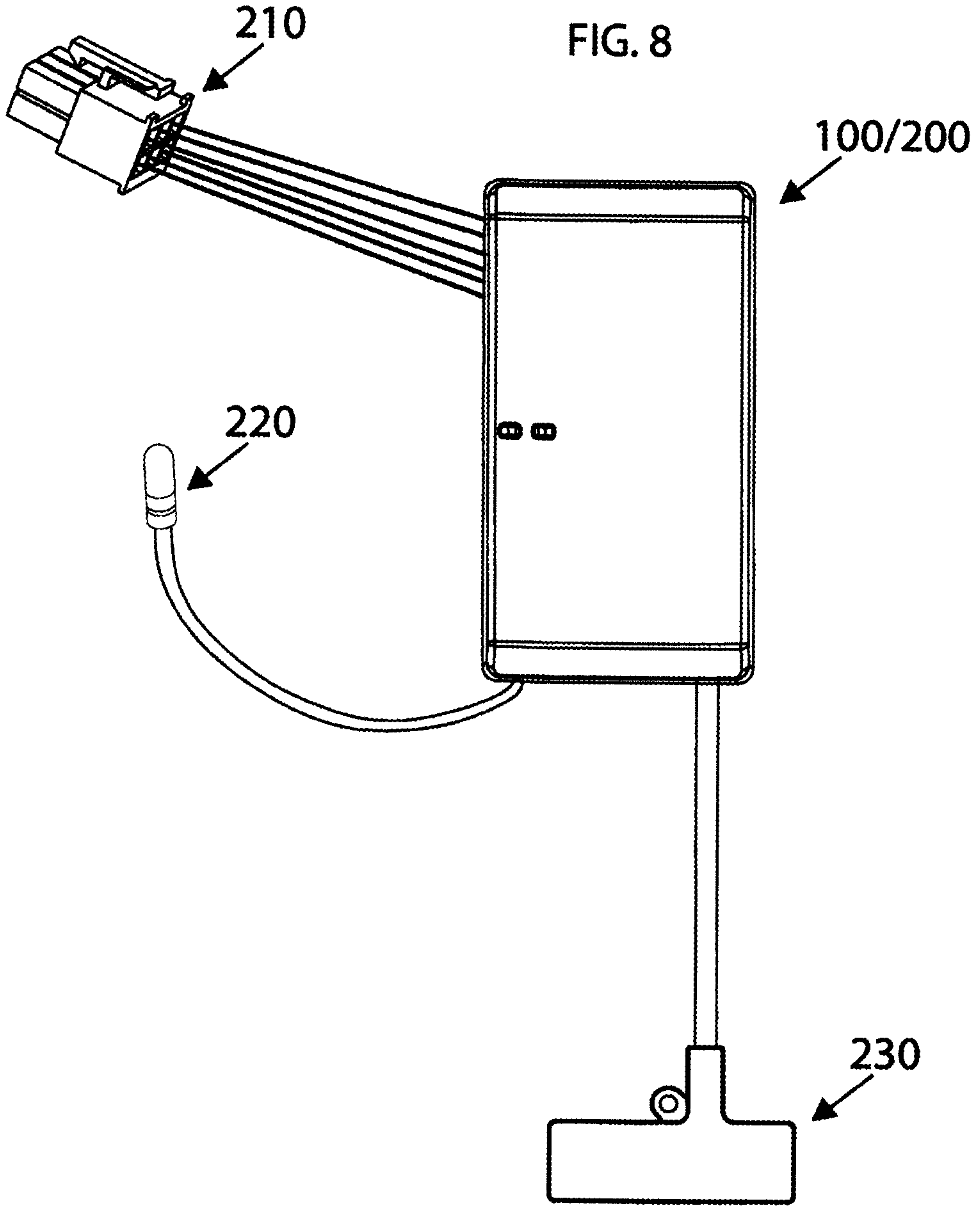
FIG. 8 is a perspective view of the smaller embodiment receiver housing of FIGS. 7A-7E with modular connector and RF antenna.

FIG. 8 is a perspective view of the smaller embodiment receiver housings 100/200 of FIGS. 6A=7E with modular connector 210 and RF antenna 220. The smaller receiver housings 100/200 can include a shrink wrap encasement shown and described in reference to FIGS. 11-12E.

Figure 9:
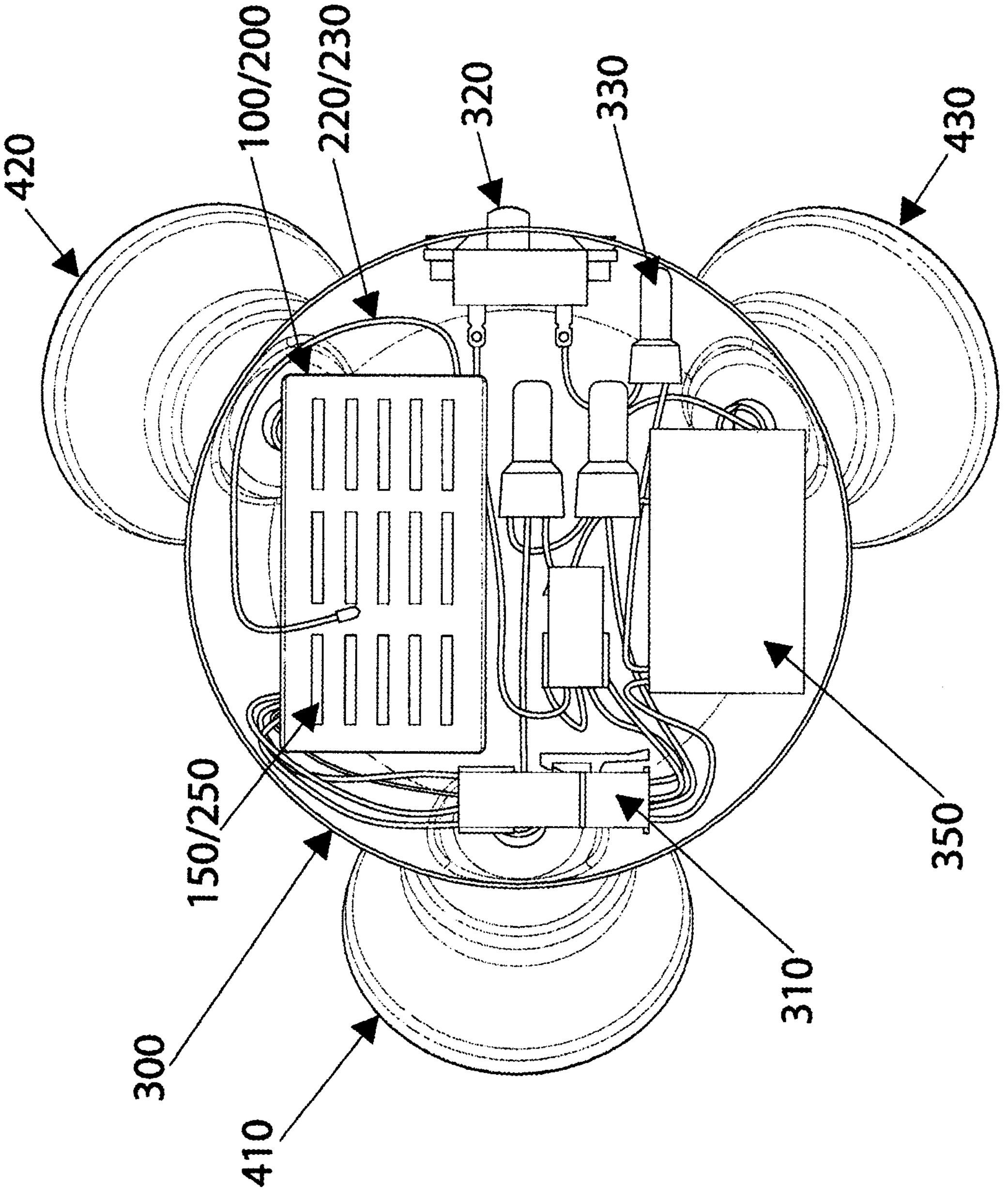
FIG. 9 is a view of the receiver housings of FIGS. 6A-6E and 7A-7E with pin connector hardwired inside of a switch housing of a ceiling fan.

FIG. 9 is a view of the receiver housings 100/200 of FIGS. 6A-6E and 7A-7E with pin connector 210 hardwired inside of a switch housing 300 of a ceiling fan as previously shown and described.

Referring to FIGS. 6A-9, the receiver housings 100/200 can include vent side openings 15/250 that allow air to circulate about the internal components.

A pin connector 210 can allow for the modular connector 210 for the receiver housings 100/200 to snap into place. As shown a single capacitor 350 (as previously described) can be connected with at least one wire crimp 330, and more wire crimp(s) 330 as needed. The switch housing 300 can include a hard wired reverse switch 320 for changing the rotational direction of the fan from clockwise to counter-clockwise, and vice versa. The ceiling fan as previously described, can have three light sockets 410, 420 and 430.

Figure 10:
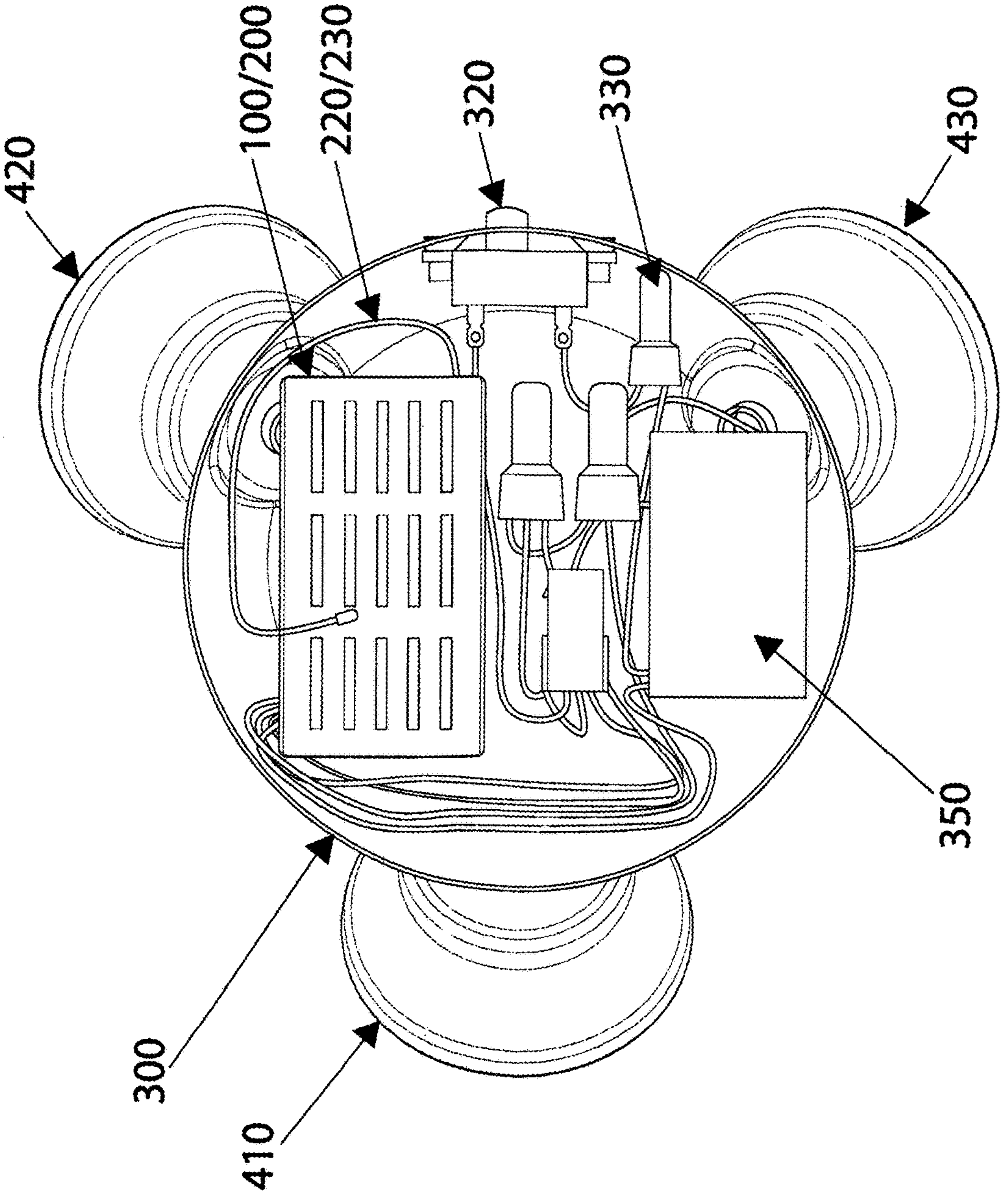
FIG. 10 is a view of the receiver housings of FIGS. 6A-6E and 7A-7E without a pin connector hardwired inside of a switch housing of a ceiling fan.

FIG. 10 is a view of the receiver housings 100/200 of FIGS. 6A-6E and 7A-7E without a pin connector 310 hardwired inside of a switch housing of a ceiling fan.

Referring to FIGS. 6A-10, FIG. 10 shows does not use a modular connector 210, and hardwires the receiver housings 100/200 inside the switch housing 300.

Figure 11:
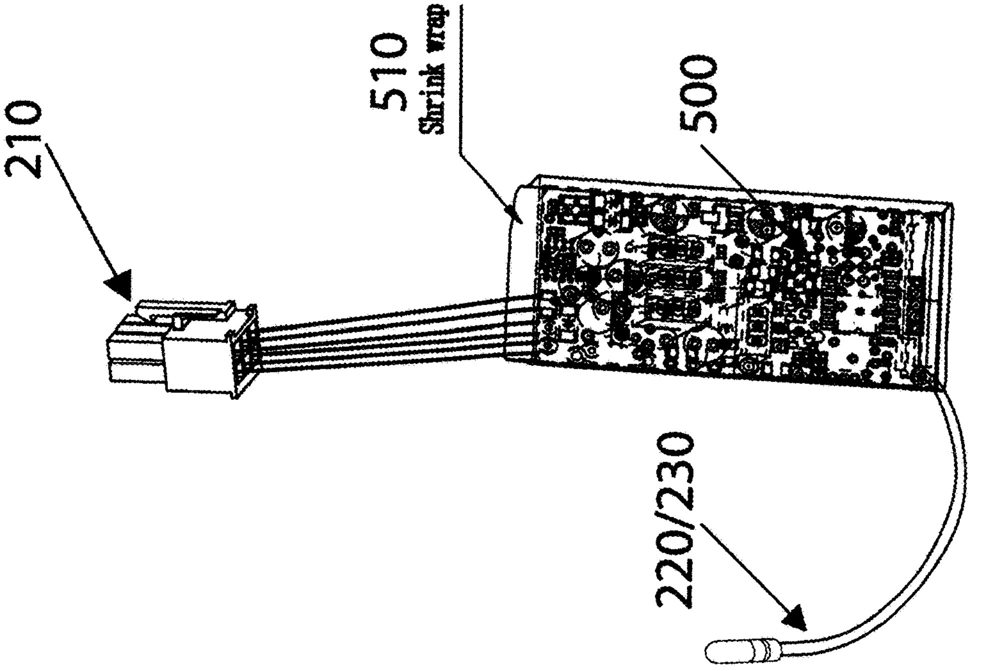
FIG. 11 is a perspective view of a small receiver with shrink wrap encasement connected to a modular connector and antenna(s).

FIG. 11 is a perspective view of a small receiver 500 with shrink wrap encasement 510 connected to a modular connector 210 and antenna(s) 220/230.

Figure 12C:
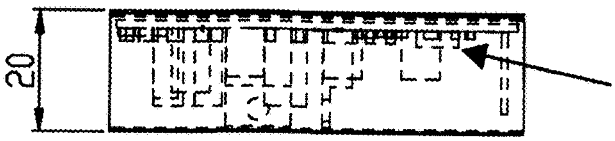
FIG. 12C is a side view of the small receiver with shrink wrap encasement shown in FIG. 11.
Figure 12D:
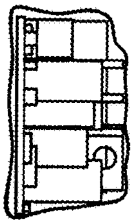
FIG. 12D is a top view of the small receiver with shrink wrap encasement shown in FIG. 11.
Figure 12B:
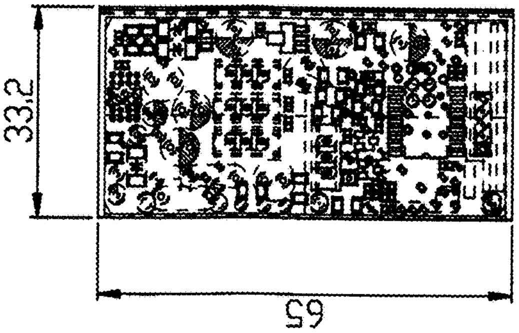
FIG. 12B is a front view of the small receiver with shrink wrap encasement shown in FIG. 11.
Figure 12E:
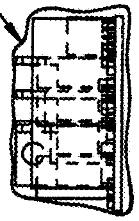
FIG. 12E is a bottom view of the small receiver with shrink wrap encasement shown in FIG. 11.
Figure 12A:
FIG. 12A is a side view of the small receiver with shrink wrap encasement shown in FIG. 11.

FIG. 12A is a side view of the small receiver 500 with shrink wrap encasement 510 shown in FIG. 11. FIG. 12B is a front view of the small receiver 500 with shrink wrap encasement 510 shown in FIG. 11. FIG. 12C is a side view of the small receiver 500 with shrink wrap encasement 510 shown in FIG. 11. FIG. 12D is a top view of the small receiver 500 with shrink wrap encasement 510 shown in FIG. 11. FIG. 12E is a bottom view of the small receiver 500 with shrink wrap encasement 510 shown in FIG. 11.

Referring to FIGS. 11-12E, a shrink wrap encasement 510 decreases the cost by eliminating the plastic shell housing about the receiver used in previous embodiments.

The shrink wrap includes a high heat-resistant plastic sheathing that shrinks in heat but will not ignite by heat to tightly wrap about the receiver. As such, the receiver does not need a plastic shell housing as described in the previous embodiments. The shrink wrapped receiver can directly be placed into the switch housing, attached by the modular connector and/or wires as needed.

The overall dimensions of the receiver in the shell housings are reduced slightly, making a shrink wrapped receiver easier to fit into tight areas of the fan.

The end-user can take a shrink wrapped receiver 500 and more easily locate it in the switch housing, or other locations as desired.

The shrink wrapped receiver can prevent accidental damage when installed, because it is smaller.

Referring to FIGS. 11-12E, the shrink wrap encasement 510 of a receiver 500 without a plastic shell, can have a length of up to approximately 65 mm, a width of up to approximately 33.2 mm, and a thickness(depth) of up to approximately 20 mm.

While the invention shows the receiver housings 100/200 inside the switch housing 300, the receiver housings 100/200 and 500 can be located in other locations, such as but not limited to the ceiling canopy, motor housing, a light kit, and the like.

A listing of components referenced in FIGS. 13A-20B will now be listed.

- 600 Ceiling fan with canopy, Built in Remote Receiver above motor in motor housing
- 610 Built in Remote C-shaped Receiver includes Printed Circuit Board (PCB) with electric components
- 650 water proof encasement
- 700 Ceiling fan with canopy housing Canopy Remote Control Receiver
- 710 Canopy Remote Control Receiver includes Printed Circuit Board (PCB) with electric components
- 750 water proof encasement
- The below Table encompasses the water proof encasements that can be used with the Remote Receiver shown in FIGS. 11-12E, and with both the built-in remote control C-shaped receiver above the motor, and the canopy remote receiver shown in FIGS. 13A-20B.

Table

Ceiling Fan Receiver Parts to be made water-resistant/waterproof to eliminate separate plastic housings/shells, and to Reduce Space.

Water-Resistant/Waterproof

| Water-Resistant/ Waterproof Application | Materials | Process (Steps) To Apply Application | Parts to Protect | Intrusion Protection (IP) Level/FIGS. |
|---|---|---|---|---|
| Shrink Wrap | PVC<br>Adhesive lined PVC | Components are inserted into a tube or pouch.<br>The tube or pouch is exposed to heat to shrink it tightly to the components | Remote receiver<br>Built In Remote C-shape Receiver<br>Canopy Remote Control Receiver | IP33<br>FIGS. 11-12E<br>FIGS. 13-20B |
| Heat Wrap | Polyamide film<br>Boron nitride filled plastic wrap | Components are inserted into a tube, pouch or covered with adhesive tape.<br>The tube, pouch or tape is exposed to heat to shrink it tightly to the components | Remote receiver<br>Built In Remote C-shape Receiver<br>Canopy Remote Control Receiver | IP53<br>FIGS. 11-12E<br>FIGS. 13-20B |
| Spray Coating | Silicone epoxy | Spray or painted on electrical components<br>Open air curing or exposed to UV light to harden | Remote receiver<br>Built In Remote C-shape Receiver<br>Canopy Remote Control Receiver | IP54<br>FIGS. 11-12E<br>FIGS. 13-20B |
| Dipping | Epoxy<br>Clear epoxy | Components are submerged in the liquid form of the protective | Remote receiver<br>Built In Remote C-shape | IP55 - IP65<br>FIGS. 11-12E<br>FIGS. 13-20B |

-continued

| Water-Resistant/Waterproof Application | Materials | Process (Steps) To Apply Application | Parts to Protect | Intrusion Protection (IP) Level/FIGS. |
|---|---|---|---|---|
| | | material. Once removed, a UV light is used to harden the material | Receiver Canopy Remote Control Receiver | |
| Putty | Epoxy Boron nitride putty | Soft, clay-like material is hand applied to the components Components can be placed in a mold then filled with putty Putty can be used to fill housings or casements. | Remote receiver Built In Remote C-shape Receiver Canopy Remote Control Receiver | IP55-IP65 FIGS. 11-12E NEW FIGS. 13+ |

Built in Remote C-Shaped Receiver (Over Motor)

FIG. 13A is a sectional view 600 of a typical ceiling fan with ceiling canopy and motor housing with Built In Remote C-shaped Receiver 610 above a motor with ceiling fan blades underneath.

FIG. 13B is another sectional view of FIG. 13A with the Built In Remote C-shaped Receiver 610 in a water proof encasement 650.

FIG. 14A is a top view of the encased Internal Remote Control C-shaped Receiver (Built In Remote Receiver) of FIGS. 13A-13B. FIG. 14B is a bottom view of the encased Internal Remote Control C-shaped Receiver (Built In Remote Receiver) of FIG. 14A.

FIG. 14C is a left side view of the encased Internal Remote Control C-shaped Receiver (Built In Remote Receiver) of FIG. 14A. FIG. 14D is a right side view of the encased Internal Remote Control C-shaped Receiver (Built In Remote Receiver) of FIG. 14A.

FIG. 14E is a front view of the encased Internal Remote Control C-shaped Receiver (Built In Remote Receiver) of FIG. 14A.

FIG. 14F is a back view of the encased Internal Remote Control C-shaped Receiver (Built In Remote Receiver) of FIG. 14A.

FIG. 15A is a top ISO perspective view of the Internal Remote Control C-shaped Receiver (Built In Remote Receiver) 610 of FIG. 14A without an encasement wrapping 650.

FIG. 15B is another top ISO perspective view of the Internal Remote Control C-shaped Receiver (Built In Remote Receiver) of FIG. 14A with the encasement wrapping 650.

FIG. 16A is a bottom ISO perspective view of the Internal Remote Control C-shaped Receiver (Built In Remote Receiver) 610 of FIG. 14A without an encasement wrapping 650.

FIG. 16B is another bottom ISO perspective view of the Internal Remote Control C-shaped Receiver (Built In Remote Receiver) 610 of FIG. 14A with the encasement wrapping 650.

Referring to FIGS. 13A-16B, an Internal Remote Control C-shaped Receiver (Built In Remote Receiver) 610, can include a in generally C-shape Printed Circuit Board (PCB) having an outer diameter of up to approximately 4.5 inches and in internal diameter of up to approximately 2 inches. On one side of the Printed Circuit Board (PCB) can include mounted electrical components that form an internal remote receiver for the ceiling fan. The electrical components can include (as shown in FIG. 14A), but not be limited to Lead Wire Connectors, Integrated Circuit (IC), capacitor(s) of approximately 10 pF to approximately 100 nF, a power supply of approximately 1 μF to approximately 1000 μF, resistor(s) of approximately 5v 100Ω.

All of the electrical components referenced above on the Printed Circuit Board (PCB) can be encased in a water-resistant/waterproof encasement, except for the lead wire connectors.

As referenced in the above table, each of encasement wrapping have an IP number.

The IP code or Ingress Protection code indicates how well a device is protected against water and dust. It is defined by the International Electrotechnical Commission (IEC) under the international standard IEC 60529[1] which classifies and provides a guideline to the degree of protection provided by mechanical casings and electrical enclosures against intrusion, dust, accidental contact, and water. It is published in the European Union by the European Committee for Electrotechnical Standardization (CENELEC) as EN 60529.

The first digit defines solid particle protection, and the second digit defines liquid ingress protection.

The Built In Remote C-shape Receiver 610 with encasement 650 can have a side length of between approximately 2.5 inches to approximately 3.5 inches, a height between approximately 1 inch to approximately 1.6 inches, and a front length between approximately 3.5 inches to approximately 4.5 inches.

As referenced in the above table, the Built In Remote C-shape Receiver can be encased in different water-resistant/waterproof applications, with IP ratings.

The Ingress Protection (IP) rating is defined by the International Electrotechnical Commission (IEC) under the standard IEC 60529, and classifies the degree of protection by mechanical casings and electrical enclosures against intrusion from solid objects (like dust) and liquids (like water).

Shrink Wrap

As referenced in the above table, the Built In Remote C-shape Receiver can be encased in a shrink wrap. The shrink wrap materials can include either PVC or an adhesive lined PVC.

The shrink wrap application can include inserting the Printed Circuit Board (PCB) with electrical components except for lead wire connectors, into a tube or pouch that is exposed to heat to shrink the material tightly to the components and Printed Circuit Board (PCB).

The shrink wrap application can have an Intrusion Protection IP) of up to IP33.

Heat Wrap

The Built In Remote C-shape Receiver can be encased in a heat wrap. The heat wrap materials can include Polyamide film or Boron nitride filled plastic wrap.

The heat wrap application can include inserting the Printed Circuit Board (PCB) with electrical components except for lead wire connectors, into a tube or pouch or covered with adhesive tape. The tube, pouch or covered with adhesive tape is exposed to heat to shrink it tightly to the components and Printed Circuit Board (PCB).

The shrink wrap application can have an Intrusion Protection IP) of up to IP53.

Spray Coating

The Built In Remote C-shape Receiver can be encased in a spray coating. The spray coating materials can include Silicone or epoxy.

The spray coating application can include spraying or painting the spray materials on the Printed Circuit Board (PCB) with electrical components except for lead wire connectors. The spraying and painting can be subject to open air curing or exposed to UV (ultra violet) light to harden.

The spray coating application can have an Intrusion Protection IP) of up to IP54.

Dipping

The Built in Remote C-shape Receiver can be encased in a dipping. The spray dipping materials can include epoxy or clear epoxy.

The dipping application can include the Printed Circuit Board (PCB) with electrical components except for lead wire connectors submerged in the liquid form of the protective material. Once the components are removed, a UV (ultra violet) light is used to harden the material.

The dipping application can have an Intrusion Protection IP) of between IP 55 to IP 65.

Putty

The Built in Remote C-shape Receiver can be encased in a putty. The putty materials can include epoxy, or Boron nitride putty forming a soft putty The putty application can include the soft, clay-like material is hand applied to the components. The components can be placed in a mold then filled with putty. Putty can be used to fill housings or encasements on the Printed Circuit Board (PCB) with electrical components except for lead wire connectors.

The putty application can have an Intrusion Protection IP) of between IP55 to approximately IP65.

Canopy Remote Control Receiver

FIG. 17A is a sectional view 700 of a typical ceiling fan with ceiling canopy remote control receiver 710 in a ceiling canopy above a motor housing with ceiling fan blades underneath.

FIG. 17B is another sectional view 700 of FIG. 17A with the canopy remote Receiver 710 in a water proof encasement 750.

FIG. 18A a top view of the encased canopy remote Receiver 710/750 of FIGS. 17A-17B. FIG. 18B is a bottom view of the encased canopy remote Receiver 710/750 of FIG. 17A FIG. 18C is a left side view of the encased canopy remote receiver 710/750 of FIG. 18A. FIG. 18D is a right side view of the encased canopy remote receiver 710/750 of FIG. 18A. FIG. 18E is a front view of the encased canopy remote receiver 710/750 of FIG. 18A.

FIG. 18F is a back view of the encased canopy remote receiver of FIG. 18A.

FIG. 19A is a top ISO perspective view of the canopy remote receiver 710 of FIG. 18A without an encasement wrapping. FIG. 19B is another top ISO perspective view of the canopy remote receiver 710 of FIG. 18A with the encasement wrapping 750.

FIG. 20A is a bottom ISO perspective view of the canopy remote receiver 710 of FIG. 18A without an encasement wrapping. FIG. 20B is another bottom ISO perspective view of the canopy remote receiver 710 of FIG. 18A with the encasement wrapping 750.

Referring to FIGS. 17A-20B, the remote control receiver 710 can include a printed circuit board (PCB) having a geometrical shape selected from the group consisting of a rectangle, a square, an oval, a t-shape, and an L-shape.

Electrical components similar to the electrical components referenced in the in-built remote control receiver can be attached to one side of the PCB board.

All of the PCB board and all of the electrical components except for at least one lead wire can be encased in the water proof wrapping.

The receiver with the printed circuit board (PCB) and electrical components can have a side length between approximately 2 inches to approximately 2.5 inches, a height between approximately 1 inch to approximately 1.25 inches, and a front length between approximately 3 inches to approximately 4 inches.

As referenced in the above table, the canopy remote control Receiver can be encased in a shrink wrap. The shrink wrap materials can include either PVC or an adhesive lined PVC.

The shrink wrap application can include inserting the Printed Circuit Board (PCB) with electrical components except for lead wire connectors, into a tube or pouch that is exposed to heat to shrink the material tightly to the components and Printed Circuit Board (PCB).

The shrink wrap application can have an Intrusion Protection IP) of up to IP33.

Heat Wrap

The canopy remote control Receiver can be encased in a heat wrap. The heat wrap materials can include Polyamide film or Boron nitride filled plastic wrap.

The heat wrap application can include inserting the Printed Circuit Board (PCB) with electrical components except for lead wire connectors, into a tube or pouch or covered with adhesive tape. The tube, pouch or covered with adhesive tape is exposed to heat to shrink it tightly to the components and Printed Circuit Board (PCB).

The shrink wrap application can have an Intrusion Protection IP) of up to IP53.

Spray Coating

The canopy remote control Receiver can be encased in a spray coating. The spray coating materials can include Silicone or epoxy.

The spray coating application can include spraying or painting the spray materials on the Printed Circuit Board (PCB) with electrical components except for lead wire connectors. The spraying and painting can be subject to open air curing or exposed to UV (ultra violet) light to harden.

The spray coating application can have an Intrusion Protection IP) of up to IP54.

Dipping

The canopy remote control Receiver can be encased in a dipping. The spray dipping materials can include epoxy or clear epoxy.

The dipping application can include the Printed Circuit Board (PCB) with electrical components except for lead wire connectors submerged in the liquid form of the protective material. Once the components are removed, a UV (ultra violet) light is used to harden the material.

The dipping application can have an Intrusion Protection IP) of between IP 55 to IP 65.

Putty

The canopy remote control receiver can be encased in a putty. The putty materials can include epoxy, or Boron nitride putty forming a soft putty The putty application can include the soft, clay-like material is hand applied to the components. The components can be placed in a mold then filled with putty. Putty can be used to fill housings or encasements on the Printed Circuit Board (PCB) with electrical components except for lead wire connectors.

The putty application can have an Intrusion Protection IP) of between IP55 to approximately IP65.

While receiver electrical components are described as being wrapped in water-resistant/water proof applications, other electrical components in the ceiling fan be separately encased in the described water-resistant/water proof applications The term "approximately" is similar to the term "about" and can be +/−15% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A ceiling fan with a water-resistant/waterproof encased remote control receiver, comprising:

a suspended ceiling fan motor housing with a built in remote control receiver mounted above a motor; and a plurality of ceiling fan blades mounted to the motor, wherein the built in remote control receiver is encased in a waterproof wrapping without a separate housing shell, in order to reduce space in the motor housing;

wherein the wrapped built-in remote control receiver includes: a printed circuit board (PCB) having a C-shape with electrical components attached to one side, the electrical components including at least one lead wire connector, wherein all of the electrical components attached to the Printed Circuit Board (PCB) are encased in the waterproof wrapping, except for the at least one lead wire connector;

wherein the C-shape PCB board with electrical components includes a side length of between approximately 2.5 inches to approximately 3.5 inches, a height between approximately 1 inch to approximately 1.6 inches, and a front length between approximately 3.5 inches to approximately 4.5 inches.

2. The ceiling fan of claim 1, wherein the waterproof wrapping includes a shrink wrap encasement of a heat resistant plastic sheathing.

3. The ceiling fan of claim 1, wherein the waterproof wrapping includes a heat wrap of a waterproof material.

4. The ceiling fan of claim 1, wherein the waterproof wrapping includes a spray coating of a waterproof material.

5. The ceiling fan of claim 1, wherein the waterproof wrapping including a dipping in a waterproof material.

6. The ceiling fan of claim 1, wherein the waterproof wrapping including a putty of a waterproof material.

7. A ceiling fan with a water-resistant/waterproof encased remote control receiver, comprising:

a ceiling canopy with a remote receiver encased in a waterproof wrapping;

a motor housing with a motor suspended from the canopy; and a plurality of ceiling fan blades mounted to the motor;

wherein the encased remote control receiver includes: a printed circuit board (PCB) having a geometrical shape with electrical components attached to one side, the geometrical shape selected from the group consisting of a rectangle, square, oval, t-shape and L-shape, the electrical components including at least one lead wire connector, wherein all of the electrical components attached to the Printed Circuit Board (PCB) are encased in the waterproof wrapping, except for the at least one lead wire connector;

wherein the Printed Circuit Board (PCB) with electrical components includes a side length between approximately 2 inches to approximately 2.5 inches, a height between approximately 1 inch to approximately 1.25 inches, and a front length between approximately 3 inches to approximately 4 inches.

8. The ceiling fan of claim 7, wherein the waterproof wrapping includes a shrink wrap encasement of a heat resistant plastic sheathing.

9. The ceiling fan of claim 7, wherein the waterproof wrapping includes a heat wrap of a waterproof material.

10. The ceiling fan of claim 7, wherein the waterproof wrapping includes a spray coating of a waterproof material.

11. The ceiling fan of claim 7, wherein the waterproof wrapping including a dipping in a waterproof material.

12. The ceiling fan of claim 7, wherein the waterproof wrapping including a putty of a waterproof material.

13. A method of replacing a remote receiver in a ceiling fan water-resistant and water proof without a separate plastic housing shell, comprising the steps of:

providing a canopy for attachment to a ceiling;

suspending a motor housing with a motor beneath the canopy; and providing a remote receiver in the ceiling fan, the remote heat-resistant receiver including a printed circuit board (PCB) having a geometrical shape with electrical components attached to one side, the geometrical shape selected from the group consisting of a C-shape, a rectangle, a square, oval, a t-shape and an L-shape, the electrical components including at least one lead wire connector; and wrapping the remote receiver in a waterproof encasement, wherein all of the electrical components attached to the Printed Circuit Board (PCB) are encased in the waterproof wrapping, except for the at least one lead wire connector;

wherein the printed circuit board (PCB) has a C-shape with electrical components attached to one side, wherein the C-shape PCB board with electrical components includes a side length of between approximately 2.5 inches to approximately 3.5 inches, a height between approximately 1 inch to approximately 1.6 inches, and a front length between approximately 3.5 inches to approximately 4.5 inches;

wherein the wrapping of the receiver is formed from a wrapping application selected from the group consisting of shrink wrap, heat wrap, spray coating, dipping and applying putty to all exterior surfaces of the receiver, except for the at least one lead wire connector.

14. A method of replacing a remote receiver in a ceiling fan water-resistant and water proof without a separate plastic housing shell, comprising the steps of:

providing a canopy for attachment to a ceiling;

suspending a motor housing with a motor beneath the canopy; and providing a remote receiver in the ceiling fan, the remote heat-resistant receiver including a printed circuit board (PCB) having a geometrical shape with electrical components attached to one side, the geometrical shape selected from the group consisting of a C-shape, a rectangle, a square, oval, a t-shape and an L-shape, the electrical components including at least one lead wire connector; and wrapping the remote receiver in a waterproof encasement, wherein all of the electrical components attached to the Printed Circuit Board (PCB) are encased in the waterproof wrapping, except for the at least one lead wire connector;

wherein the printed circuit board (PCB) includes a geometrical selected from the group consisting of a rectangle, square, oval, t-shape and L-shape, wherein the Printed Circuit Board (PCB) with electrical components includes a side length between approximately 2 inches to approximately 2.5 inches, a height between approximately 1 inch to approximately 1.25 inches, and a front length between approximately 3 inches to approximately 4 inches;

wherein the wrapping of the receiver is formed from a wrapping application selected from the group consisting of shrink wrap, heat wrap, spray coating, dipping and applying putty to all exterior surfaces of the receiver, except for the at least one lead wire connector.

* * * * *